United States Patent
Nuotio et al.

(10) Patent No.: US 8,239,149 B2
(45) Date of Patent: Aug. 7, 2012

(54) METHOD FOR DETERMINING THE OPERATING CONDITION OF A PHOTOVOLTAIC PANEL

(75) Inventors: Mika Nuotio, Sunnyvale, CA (US); Kent Kernahan, Cupertino, CA (US)

(73) Assignee: Array Power, Inc., Sunnyvale, CA (US)

( * ) Notice: Subject to any disclaimer, the term of this patent is extended or adjusted under 35 U.S.C. 154(b) by 463 days.

(21) Appl. No.: 12/491,335

(22) Filed: Jun. 25, 2009

(65) Prior Publication Data

US 2010/0332167 A1    Dec. 30, 2010

(51) Int. Cl.
  *G01R 27/00*    (2006.01)
  *G06F 15/00*    (2006.01)
(52) U.S. Cl. ............. 702/65; 307/18; 324/611; 702/64; 702/130; 702/182
(58) Field of Classification Search .................. 702/60, 702/62, 64, 65, 85, 99, 107, 183, 184, 185, 702/130, 182; 136/244, 251; 307/18, 31, 307/80, 130; 318/139; 320/102; 324/611; 340/636.1; 363/79, 97
See application file for complete search history.

(56) References Cited

U.S. PATENT DOCUMENTS

| | | | |
|---|---|---|---|
| 6,844,739 B2 * | 1/2005 | Kasai et al. | 324/611 |
| 6,892,165 B2 * | 5/2005 | Yagi et al. | 702/183 |
| 7,719,140 B2 | 5/2010 | Ledenev et al. | |
| 2008/0238195 A1 * | 10/2008 | Shaver et al. | 307/18 |
| 2009/0160258 A1 | 6/2009 | Allen et al. | |
| 2009/0160259 A1 | 6/2009 | Naiknaware et al. | |
| 2009/0183760 A1 | 7/2009 | Meyer | |
| 2009/0310391 A1 | 12/2009 | Becker-Irvin et al. | |
| 2010/0152917 A1 | 6/2010 | Kernahan | |
| 2010/0157632 A1 | 6/2010 | Batten et al. | |
| 2010/0157638 A1 | 6/2010 | Naiknaware et al. | |
| 2011/0055303 A1 | 3/2011 | Slavin | |
| 2011/0055445 A1 | 3/2011 | Gee et al. | |
| 2011/0160930 A1 | 6/2011 | Batten et al. | |
| 2011/0216512 A1 | 9/2011 | Vosper et al. | |

OTHER PUBLICATIONS

C. Liu et al., "Advanced Algorithm for MPPT Control of Photovoltaic Systems," Dept. of Electrical & Computer Engineering, Ryerson University; Canadian Solar Buildings Conference, Aug. 20-24, 2004, Montreal, Canada.

G.M.S. Azavedo et al., "Comparative Evaluation of Maximum Power Point Tracking Methods for Photovoltaic Systems," Journal of Solar Energy Engineering, Aug. 2009, vol. 131.

N. Moubayed et al., "A Comparison of Two MPPT Techniques for PV System," WSEAS Transactions on Environment & Development, Issue 12, vol. 5, Dec. 2009.

Faranda et al., "Energy Comparison of MPPT Techniques for PV Systems," WSEAS Transactions on Power Systems, Issue 6, vol. 3, Jun. 2008.

(Continued)

*Primary Examiner* — John H Le

(74) *Attorney, Agent, or Firm* — The Marbury Law Group, PLLC

(57) ABSTRACT

Due to their exposure to extreme environments, it is expected that parts or all of a solar power system will experience degradation in performance. The degradation may be due to temporary environmental factors, such as cloud cover; damage or localized soiling; a general dirty condition; or ageing of the components. A method is disclosed wherein a remote system may detect degraded performance and determine the cause, thereby enabling a decision as to the appropriate corrective action to be taken, if any.

44 Claims, 18 Drawing Sheets

OTHER PUBLICATIONS

Chao et al., "An Intelligent Maximum Power Point Tracking Method Based on Extension Theory for PV Systems," Expert Systems with Applications, Copyright 2009 Elsevier Ltd.
W. Xiao, "A Modified Adaptive Hill Climbing Maximum Power Point Tracking (MPPT) Control Method for Photovoltaic Power Systems," Master of Applied Science Thesis, University of British Columbia, Jul. 2003, 116pgs.
M. Azab, "A New Maximum Power Point Tracking for Photovoltaic Systems," Proceedings of World Academy of Science, Engineering & Technology, vol. 34, Oct. 2008, pp. 571-574.
E. V. Solodovnik et al., "Power Controller Design for Maximum Power Tracking in Solar Installations," IEEE Transactions on Power Electronics, vol. 19, No. 5, Sep. 2004, pp. 1295-1304.
T. Esram et al., "Dynamic Maximum Power Point Tracking of Photovoltaic Arrays Using Ripple Correlation Control," IEEE Transactions on Power Electronics, vol. 21, No. 5, Sep. 2006, pp. 1282-1291.
Chou et al., "Techniques for Maximizing Efficiency of Solar Energy Harvesting Systems," Proceedings of the Fifth Conference on Mobile Computing and Ubiquitous Networking (*ICMU* 2010), Seattle, WA, Apr. 26-28, 2010, 7pgs.
E. Koutroulis et al., "Development of a Microcontroller-Based, Photovoltaic Maximum Power Point Tracking Control System," IEEE Transactions on Power Electronics, vol. 16, No. 1, Jan. 2001, pp. 46-54.
J. Ahmad et al., "A Voltage Based Maximum Power Point Tracker for Low Power and Low Cost Photovoltaic Applications," World Academy of Science, Engineering & Technology, vol. 60, 2009, pp. 712-715.
S. Roberts, "Peak Power Tracker Project," The Microship Status Reports, Mar. 14, 1997, Issue No. 118, www.microship.com., 6pgs.
H. Knopf, "Analysis, Simulation, & Evelution of Maximum Power Point Tracking (MPPT) Methods for a Solar Powered Vehicle," Master of Science in Electrical & Computer Engineering Thesis, Portland State University, 1999, 177pgs.

C. Eskow, "What You Need to Know About MPPT for PV Arrays," Energy Efficiency & Technology, Sep. 1, 2009, 3pgs.
Silvestre, S.; Chouder, A.; Shading effects in characteristic parameter of PV modules, Proceedings of the 2007 Spanish Conference on Electron Devices, Retrieved from the internet from: URL<http://ieeexplore.ieee.org/stamo/stamp/jsp?arnumber=04271182>.
Nema, R. K.; Nema, S.; Agnihotir, G.; Computer simulation based study of phtovoltaic cells/modules and their experimental verification, Journal of Recent Trends in Engineering, vol. 1, No. 3, May 2009.
Govil, K.K., "Maximum-power points of solar cells with simultaneous series and shunt losses", International Journal of Electronics, vol. 56, No. 2, Feb. 1984.
Nge, Chee Lim, et al. "A Comparative Simulation Analysis of Maximum Power Point Tracking Approaches"; Norweigan University of Science and Technology; European Photovoltaic Solar Energy Conference and Exhibition (2009).
Castaneda, Giraldo, et al. "Maximum Power Point Tracking Using Modified P&O Method for the Off Grid"; University of Puerto Rico, Mayaguez; Publ No. 1455930; 92 pgs; Dec. 2008.
Carlsson, Thomas, et al. "Identification of Degradation Mechanisms in Field-tested CdTe Modules"; Progress in Photovoltaics: Research and Applications; vol. 14, Issue 3, pp. 213-224; May 2006.
Mullejans, Harald, et al. "Reliability of Routine 2-Diode Model Fitting of PV Modules"; 19th European Solar Energy Conference and Exhibition—Paris, France; Jun. 7-11, 2004.
Schumacher, Jurgen, et al. "Exact Analytical Calculation of the One-Diode Model Parameters From PV Module Data Sheet Information"; Proceedings of 22nd European Photovoltaic Solar Energy Conference (EU PVSEC)—Milan, Italy; Sep. 2007.
King, D.L., et al. "Photovoltaic Module Performance and Durability Following Long-Term Field Exposure"; Progress in Photovoltaics: Research and Applications; vol. 8, Issue 2, pp. 241-256; Mar./Apr. 2000.

\* cited by examiner

METHOD FOR DETERMINING THE OPERATING CONDITION OF A PHOTOVOLTAIC PANEL

CROSS-REFERENCE TO RELATED APPLICATIONS

This patent application is related to the commonly-owned U.S. utility patent application Ser. No. 12/061,025 now U.S. Pat. No. 7,719,864 titled "DISTRIBUTED MULTIPHASE CONVERTERS", submitted 2 Apr. 2008 by Kent Kernahan and Sorin Spanoche and to commonly-owned U.S. patent application Ser. No. 12/335,357 now United States Patent Publication 20100152917 titled "DETECTION AND PREVENTION OF HOT SPOTS IN A SOLAR PANEL" submitted 15 Dec. 2008 by Kent Kernahan, both incorporated herein by reference in their entirety.

BACKGROUND

Photovoltaic-type solar power generation is rapidly being deployed as both isolated residential systems and as utility-grade power generators. In both, an area is covered with solar panels wherein the area is large enough to have significant sun illumination or shading differences between panels in a system. Similarly, there may be significant panel to panel differences in soiling, dust coverage, mechanical or electrical degradation, and even aging in that not all panels in a system may have been installed at the same time nor have been manufactured by the same maker or even have the same capacity or other characteristics. Due to exposure to extreme conditions of heat, cold, moisture, wind, salt spray, sand, and other environmental factors, problems with one or more panels from time to time is to be expected.

System problems must be detected, then appropriately responded to. Typical installations today provide little information regarding the operating conditions of individual panels. In response, some power providers periodically send trained technicians to evaluate performance, visually look for damage or dirt, and measure certain operational parameters; an expensive procedure. If the technician is sent too often with no problems found, the cost is wasted. If a problem develops and the technician does not visit soon or the problem is not one appropriate for a trained technician to be required, there is an opportunity cost to under-delivering power that could have been delivered. For example, if performance is low but the panels are simply dirty, a less expensive cleaning person could be sent to clean the panels rather than having a trained technician do so or the technician make a visit just to request a cleaning crew be sent instead.

As the solar power generation industry has matured and competition become more keen, power providers are being asked to base quotes and charges upon actual power delivered, with a minimum guarantee, rather than on simply installed capacity. Thus maintaining optimum performance is critical. In addition, the aging of a system and its panels must be recognized so that an economic decision can be made regarding when and if a panel or panels should be replaced.

What is needed is a remote means for periodically determining the performance of a system as a whole as well as the individual components of the system. Once less than optimum performance is detected, what is needed is the means to then determine the nature of the problem to enable a decision to be made regarding what, if any, steps should be taken in response.

SUMMARY

Fill factor of a photovoltaic cell or module is defined as the ratio of the maximum output power to the product of the open-circuit voltage value times the short-circuit current value of the module. It is a measure of rectilinearity of the I-V curve of the array. The long term ageing effects of crystalline and thin-film photovoltaic cells and modules manifest themselves as a fill-factor reduction on the measured I-V curve Compared to the theoretical, the IV-curve of a real solar cell with series and shunt resistances is shifted closer to the origin of the coordinate system. This is because the panel series resistance, Rs, causes the current values to become smaller, while the shunt resistance, Rsh, reduces the voltage.

According to the present invention, a solar panel electronic controller, for example an array converter, periodically measures its associated photovoltaic panel's temperature, determines series and shunt resistances, and computes the fill factor. In some embodiments the system also maintains a long term trend of these parameters. The computations are based on periodically sampled I-V curve and module temperature measurements. These measurements are correlated with a model of the photovoltaic module. The model is calibrated with I-V curve data points measured by an I-V tester by the panel manufacturer at the time of manufacturing.

The data taken makes it possible to identify and diagnose problems within the photovoltaic module. Anomalies in the I-V curve are used to differentiate between performance degradation caused by ageing effects of the photovoltaic module, damage, and external factors causing degradation, such as soiling and shading.

The ability to remotely monitor and appropriately respond to problems found opens the possibility for performance yield guarantees as yield reductions caused by the solar plant can be detected and liabilities assigned to the solar plant owner vs. the photovoltaic module manufacturer.

Long term data harvesting of the fill factor data of thousands of field deployed panels can be used to improve long term predictability of photovoltaic module degradation. This information can be used to fine tune warranty reserves. It may also be used as a marketing tool to substantiate the long term energy yield of a specific photovoltaic module.

DETAILED DESCRIPTION OF THE INVENTION

Definition of Some Terms

Figure 1:
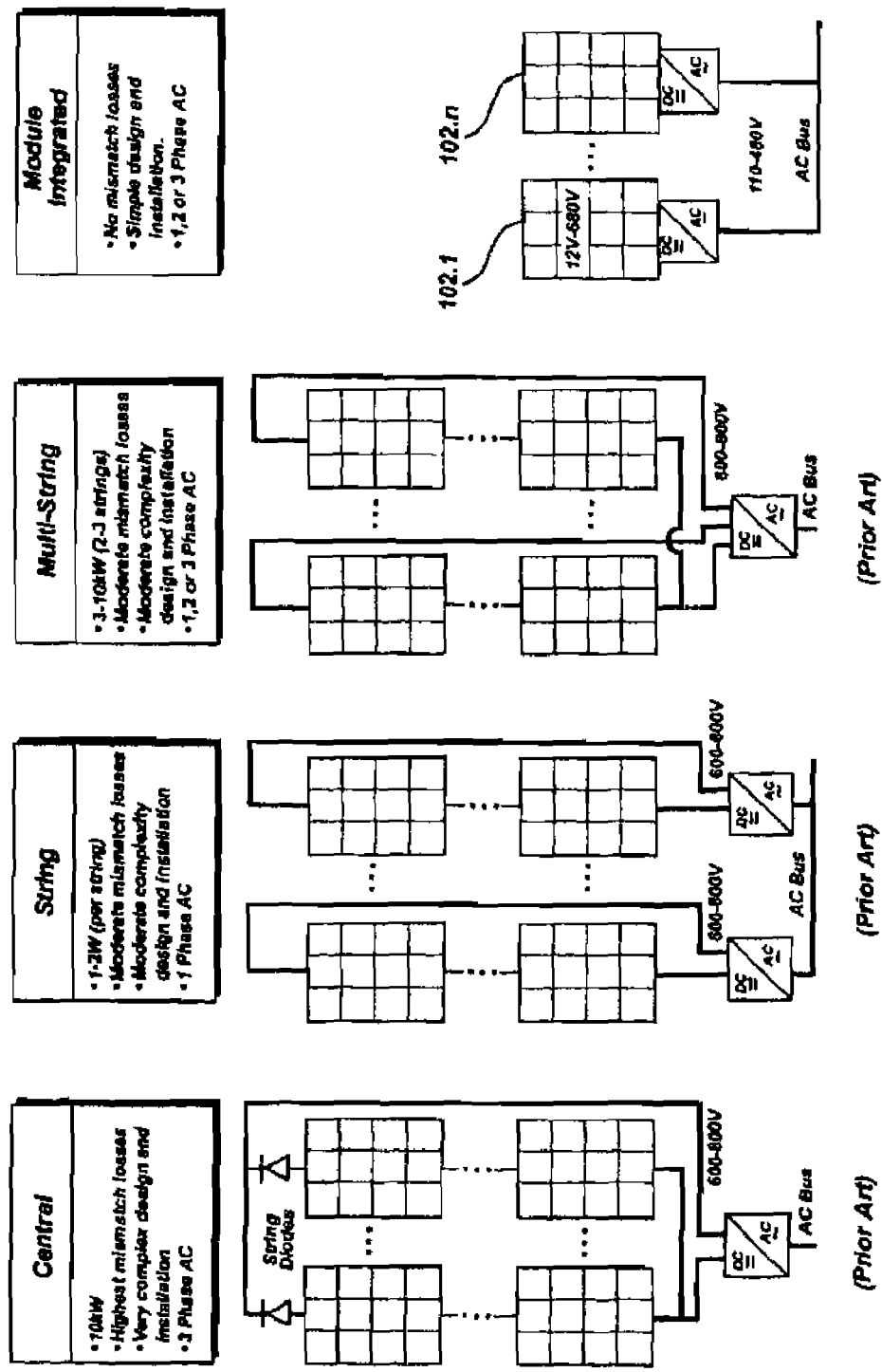
FIG. 1 shows examples of the prior art and a brief example of the present invention.
Figure 2:
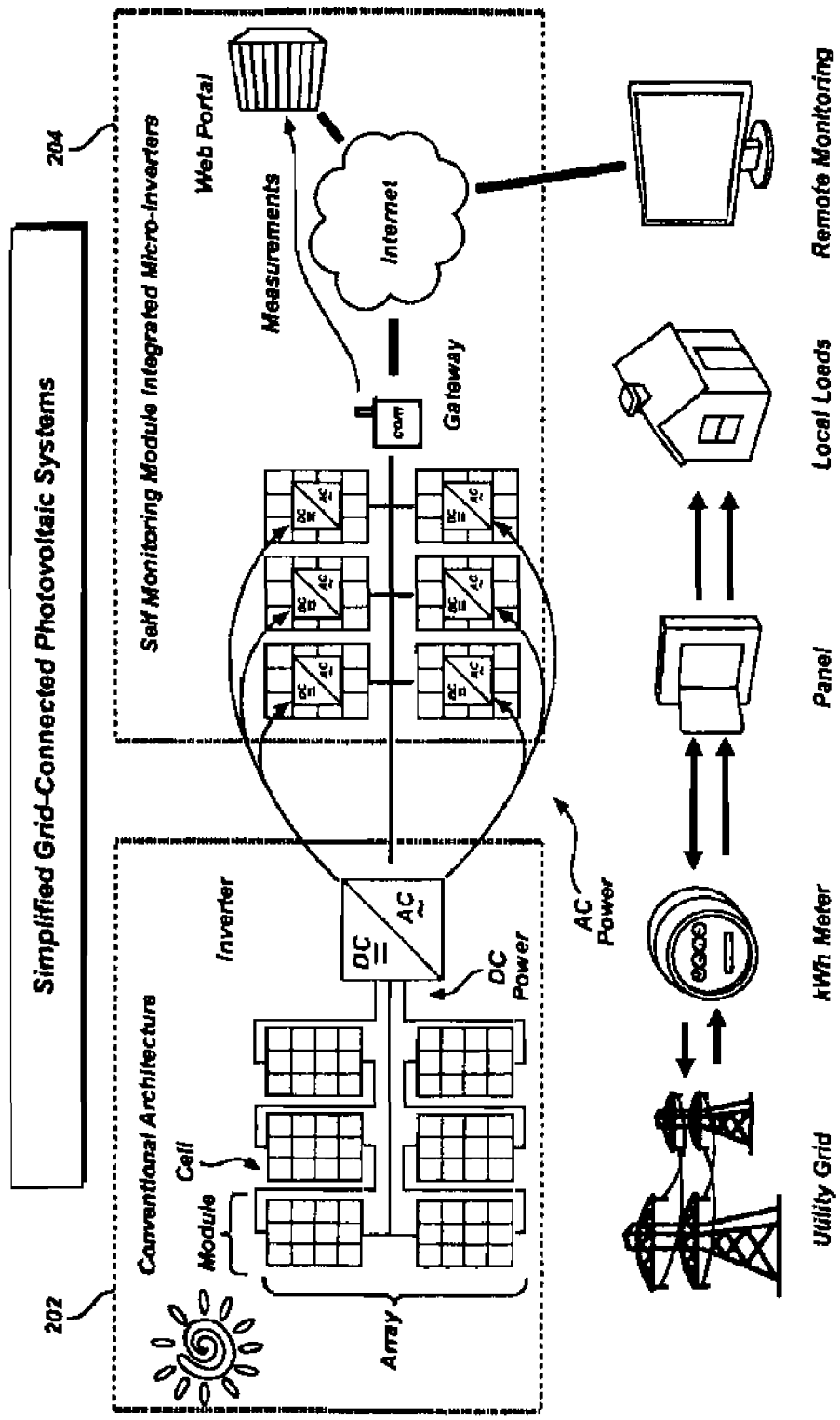
FIG. 2 is an example of grid-connected photovoltaic systems.
Figure 3:
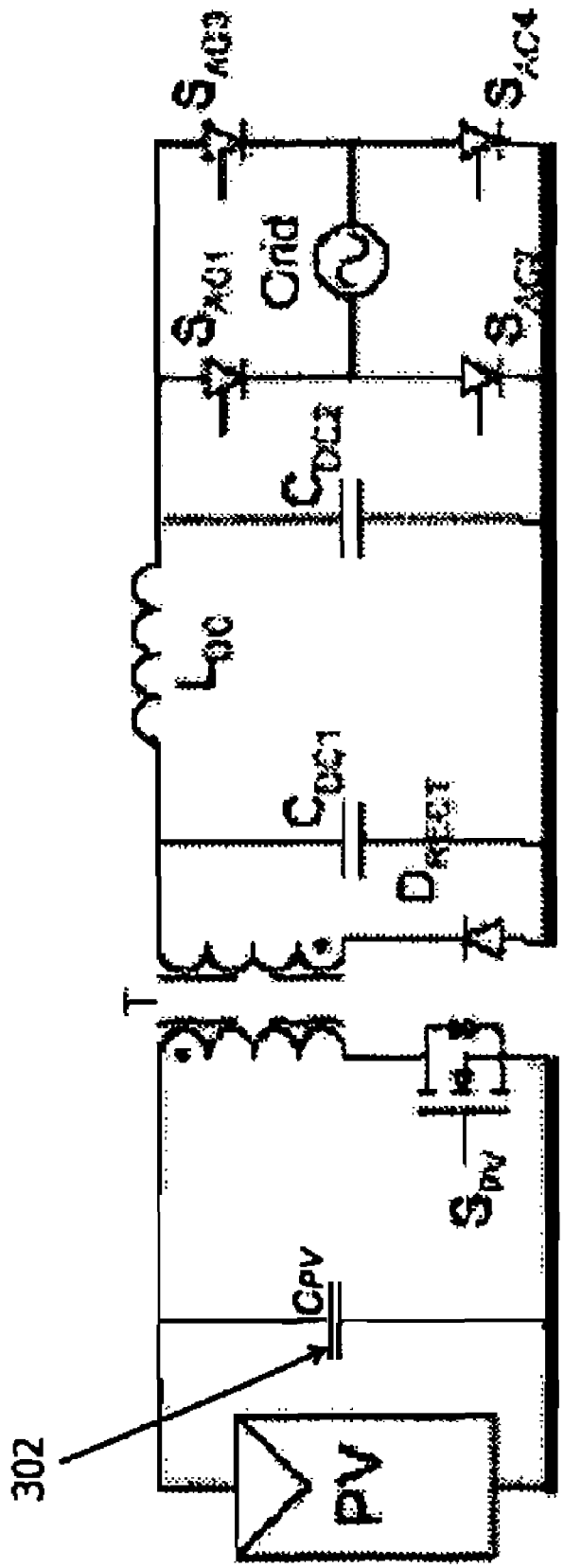
FIG. 3 is an example of the current art. PRIOR ART.

| | |
|---|---|
| Array converter | A power converter module for controlling an individual photovoltaic panel in cooperation with other similar power converter modules as disclosed in U.S. patent application 12/061,025. |
| Rs | Photovoltaic cell or module series resistance |
| Rsh 102 | Photovoltaic cell or module shunt resistance |
| Voc | Photovoltaic cell or module open circuit voltage |
| Isc | Photovoltaic cell or module short circuit current |
| Vmp | Photovoltaic cell or module voltage at maximum power |
| MPPT | Maximum power point tracking |
| PAM | Pulse Amplitude Modulation. A form of signal modulation where the message information is encoded in the amplitude of a series of signal pulses. |
| PCM | Pulse Code Modulation. A digital representation of an analog signal where the magnitude of the signal is sampled regularly at uniform intervals, then quantized to a series of symbols in a digital (usually binary) code. |

According to the present invention, a DC to pulse amplitude modulated ("PAM") current converter, denominated a "PAMCC" is connected to an individual solar panel ("PV"). A solar panel typically is comprised of a plurality, commonly seventy-two, individual solar cells connected in series, wherein each cell provides approximately 0.5 volt at some current, the current being a function of the intensity of light flux impinging upon the panel. The PAMCC receives direct current ("DC") from a PV and provides pulse amplitude modulated current at its output. The pulse amplitude modulated current pulses are typically discontinuous or close to discontinuous with each pulse going from near zero current to the modulated current and returning to near zero between each pulse. The pulses are produced at a high frequency relative to the signal modulated on a sequence of pulses. The signal modulated onto a sequence of pulses may represent portions of a lower frequency sine wave or other lower frequency waveform, including DC. When the PAMCC's output is connected in parallel with the outputs of similar PAMCCs an array of PAMCCs is formed, wherein the output pulses of the PAMCCs are out of phase with respect to each other. An array of PAMCCs constructed in accordance with the present invention form a distributed multiphase inverter whose combined output is the demodulated sum of the current pulse amplitude modulated by each PAMCC. If the signal modulated onto the series of discontinuous or near discontinuous pulses produced by each PAMCC was an AC current sine wave, then a demodulated, continuous AC current waveform is produced by the array of PAMCCs. This AC current waveform is suitable for use by both the "load", meaning the premises that is powered or partially power by the system, and suitable for connection to a grid. For example, in some embodiments an array of a plurality of PV-plus-PAMCC modules are connected together to nominally provide split-phase, Edison system 60 cps 240 volt AC to a home.

Before discussing an array comprising a plurality of PV-plus-PAMCC modules, we first look at an individual PAMCC. For example, referring to FIG. 4, a PV panel is electronically represented by the diodes and capacitor shown as reference numeral 401. Collectively the components comprising an PAMCC (or sometimes "micro inverter") are referred to as simply "the PAMCC 400." Current is provided by the PV 401 to a positive input terminal 402 and a negative input terminal 403. The positive input terminal 402 is connected in series with a coil L 1 406. The negative input terminal 403 is connected in series with a coil L 2 405. In one embodiment coils L 1 406 and L 2 405 form a one-to-one transformer with two input and two output terminals. Such an embodiment provides better current matching through the two current paths. Hereinafter we refer to the single transformer as "T 1" 407. A switch Q 1 404, for example an NMOS FET, is connected across the load side of the transformer 407, with the source of Q 1 404 connected in parallel to the negative terminal of the T 1 407 output. Note that the negative sides of the PV 401 and of the PAMCC 400 are floating; that is, they are not grounded. A controller 412 has an output terminal 414 which provides a signal to the control gate (Q 1 G) of Q 1 404 on a line 411. In some embodiments the controller 412 is a microprocessor with additional logic and is operated by a program. The controller 412 is discussed in more detail hereinafter.

The controller 412 comprises a plurality of output terminals, each operated independently. Four controller 412 output terminals 415 through 418 are connected to the control terminals of four SCRs (CR 11 424; CR 22 423; CR 12 425; and CR 21 426 respectively) by four lines 119 through 422 respectively (inner-connections not shown). Each line, therefore each SCR, is independently controlled by control signals from the controller 412. The anode terminals of CR 11 424 and CR 22 423 are connected in parallel to the positive output terminal of T 1 407. The cathode terminals of SCRs CR 12 425 and CR 21 426 are connected in parallel to the negative output terminal of T 1 407. The cathode terminal of SCR CR 11 424 and the anode terminal of SCR CR 12 425 are connected in parallel to a coil L 12 430. The cathode terminal of SCR CR 22 423 and the anode terminal of SCR CR 21 426 are connected in parallel to a coil L 22 431. A terminal 434 from coil L 12 430 is arbitrarily designated as providing a "phase 1" (P 1) output and a terminal 436 from coil L 22 431 is arbitrarily designated as providing a "phase 2" (P 2) output. In some embodiments the coils L 12 430 and L 22 431 are embodied in a one-to-one transformer. In the embodiment exemplified in FIG. 4 coils L 12 430 and L 22 136 are separate coils. A capacitor C 12 438 is across the input side of coil L 12 430 and a neutral output terminal 432. Another capacitor C 22 is across the input side of coil L 22 431 and the neutral output terminal 432. In another embodiment there is no neutral output terminal 432 and there is a single capacitor across the input terminals of coil L 12 430 and L 22 431; in this embodiment the voltage rating of the capacitor is at least twice that of capacitors C 22 440 and C 12 438.

The method of the invention is implemented by control signals on lines 411 and 419 through 422. In particular the control signal Q 1 G on line 411 and signals CR 11 T on line 419; CR 22 T on line 420; CR 12 T on line 421; and CR 21 T on line 422 connect and disconnect the current provided by PV 401 in a sequence within the PAMCC 400 with a high-frequency period, for example 30 KHz, which provides a PCM signal which is modulated by a slower, 60 cycle pattern, thereby providing an output whose amplitude is a PAM signal approximating a sine wave.

Figure 4:
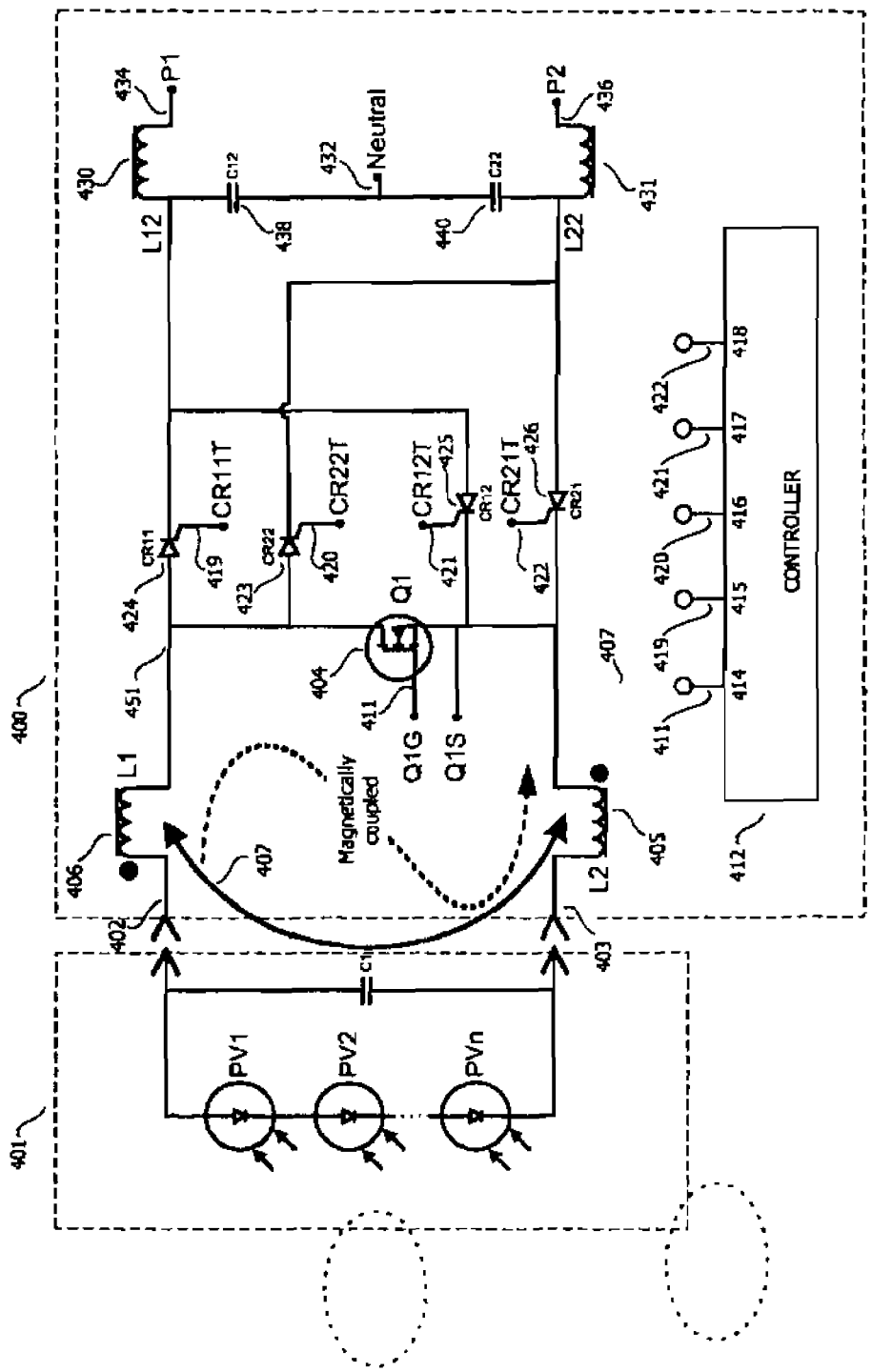
FIG. 4 is an example of a single pulse amplitude modulated current converter according to the present invention.

Referring to FIG. 4, the initial conditions are as follows: Q 1 404, CR 11 424, CR 22 423, CR 12 425 and CR 21 426 de-energized; coils L 1 406, L 2 405, L 12 430 and L 22 431 empty of current; and photovoltaic cells PV 1 through PVn dark. In this condition the grid AC voltage is applied between P 1 434 and P 2 436 and experiences a path through L 12 430, C 12 438, C 22 440 and L 22 431. The resonant frequency selected for a reconstruction filter comprising L 12 430 and C 12 438 is typically chosen to be about one half the switching frequency of Q 1 404. The resonant frequency of a reconstruction filter comprising L 22 431 and C 22 440 is chosen to be the same as the reconstruction filter of L 12 430 and C 12 438. In one embodiment the transistor Q 1 404 is selected for a specified switching frequency of approximately 30 kHz and the resonant frequency of the reconstruction filters are then designed for 15 kHz. With the grid AC voltage typically being 60 Hz, an unimportant amount of capacitive reactive load is presented to the grid.

Circuit operation begins with the solar panel 401 being exposed to sufficient light to produce significant current. The presence of the current may be observed as an increase in voltage across Q 1 404. At this point Q 1 404 is initially turned on by applying a signal from controller 412 on line 411 between Q 1 G and Q 1 S. The interface between the controller 412 and the transistor Q 1 404 may be optically isolated, transformer coupled, or the controller 412 may be connected to Q 1 S. In this state L 1 406 and L 2 405 begin to charge with current. When the voltage across PV 401 falls to a predetermined value, the time to charge the coils is noted in order to calculate the current and standard operation begins with the next grid zero crossing. In one embodiment this is when the voltage at P 1 crosses above P 2 while P 1 is going positive and P 2 is going negative. At this point signals CR 11 T 419 and CR 21 T 421 are asserted such that CR 11 424 and CR 21 426 will conduct when current are applied to them.

CASE 1

PWM Modulation for Positive Half Wave of the Grid

Figure 5:
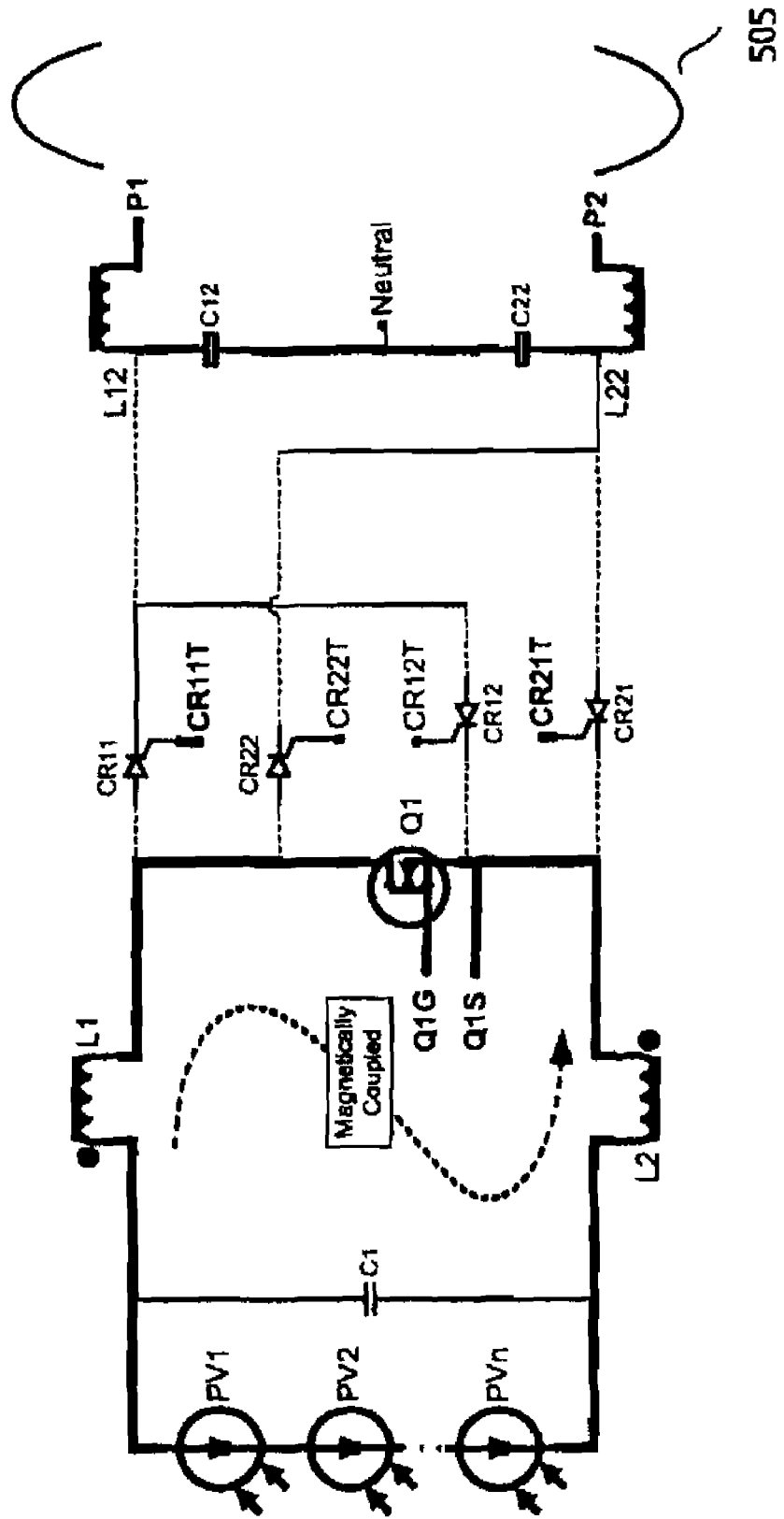
FIG. 5 shows a pulse amplitude modulated current converter with a transistor completing the circuit to charge inductors while reconstruction filters produce current pulses for the grid positive half phase.

FIG. 5 through FIG. 8 will be referred to in describing the operation of PAMCC 400. Note that the components correspond to those of FIG. 4, but the reference numbers have been left off so as not to obscure the description. However we refer to the reference numbers provided by FIG. 4. Looking to FIG. 5, with L 1 406 and L 2 405 charged, Q 1 404 is turned off for a pulse width modulated time. After the off time has expired, Q 1 404 is turned on until the end of the current switching cycle. During the time that Q 1 404 is off, current previously stored in L 1 406 and L 2 405, together with the current flowing in PV 401, is applied to the input terminals of CR 11 424 and CR 21 426, which remain enabled as a result of the signals CR 11 T 419 and CR 21 T 421 for the entire positive half cycle of the grid. The positive half cycle of the grid is defined as the condition wherein the voltage at output terminal P 1 434 is greater than the voltage at output terminal P 2 436. The charge in the current pulse delivered through the SCR CR 11 424 is initially stored on capacitor C 12 438, creating a voltage more positive on the near end of coil L 12 430 relative to the end of coil L 12 which is connected to the output terminal P 1 434. The charge in the current pulse delivered through SCR CR 21 426 is initially stored on capacitor C 22 440, a voltage more negative on the near end of coil L 22 431 relative to the end of coil L 22 which is connected to the output terminal P 2 436. This is the initial condition for both the reconstruction filter comprising L 12 430, C 12 438 and the reconstruction filter comprising L 22 431, C 22 440. At this point the reconstruction filters will transform the pulse width modulated current pulse delivered to them to a pulse amplitude modulated (PAM) half sine wave of current 505 delivered to the grid as shown in FIG. 5.

The resonant frequency for the reconstruction filters are chosen to be about one half the switching frequency of Q 1 404 so that one half of a sine wave of current will be provided to P 1 434 and P 2 436 for each pulse width modulated current pulse delivered to them. Since the resonant frequency of each reconstruction filter is independent of the pulse width of current applied to it, and the charge in the instant current pulse applied to the reconstruction filter must be equal to the charge in the half sine wave of current delivered out of the reconstruction filter to the grid, changes in the pulse width of input current will be reflected as changes in the amplitude of the output of the reconstruction filters. As the current in the inductors in the reconstruction filters returns to zero, the next pulse of current is delivered to the capacitors of the reconstruction filters because the frequency of the reconstruction filters is one half the rate at which pulse width modulated current pulses are produced by Q 1 404.

The off time of Q 1 404 is modulated such that the width of current pulses produced is in the shape of the grid sine wave. The reconstruction filters transform this sequence of pulse width modulated current pulses into a sequence of pulse amplitude modulated current pulses whose amplitude follows corresponding points of the shape of the grid sine wave.

So long as the grid half cycle remains positive at the terminal P 1 434 relative to the output of terminal P 2 436, further current pulses are produced by repeating the process described hereinbefore, beginning at "CASE 1: PWM modulation for positive half wave of the grid".

The negative zero crossing of the grid voltage is defined as the condition wherein the voltage at terminal P 1 434 is equal to the voltage at terminal P 2 436 after P 1 434 has been more positive than P 2 436. Prior to the negative zero crossing, Q 1 404 is turned on, thereby removing current from CR 11 424 and CR 21 426. At this point the signals CR 11 T 419 and CR 21 T 421 are de-asserted, preventing SCRs CR 11 424 and CR 21 426 from conducting current during the grid negative half cycle. After the negative zero crossing, with the voltage of terminal P 1 434 more negative than the voltage of terminal P 2 436, the signals CR 22 T 420 and CR 12 T 421 are then asserted, enabling CR 22 423 and CR 12 425 to conduct when current is applied to them.

CASE 2

PWM Modulation for Negative Half Wave of Grid

Figure 6:
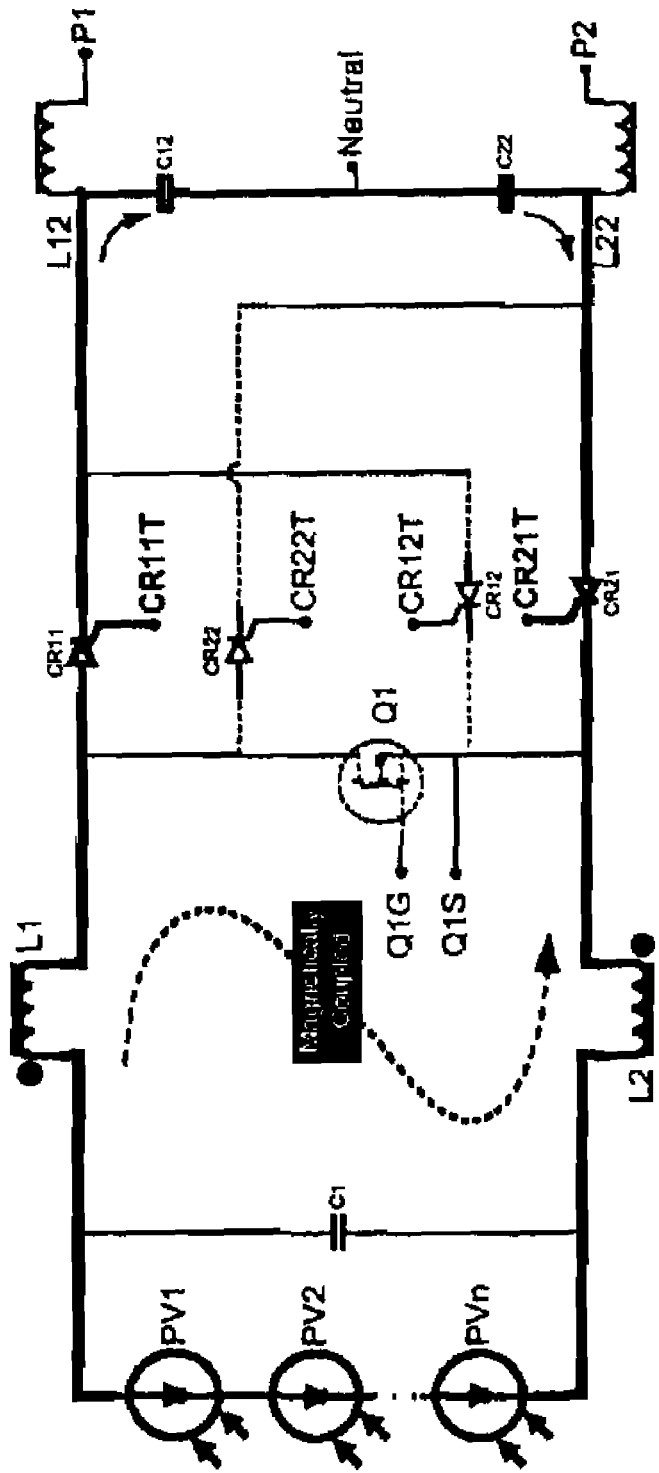
FIG. 6 shows a pulse amplitude modulated current converter with current flowing through into the reconstruction filters for the grid positive half phase.
Figure 7:
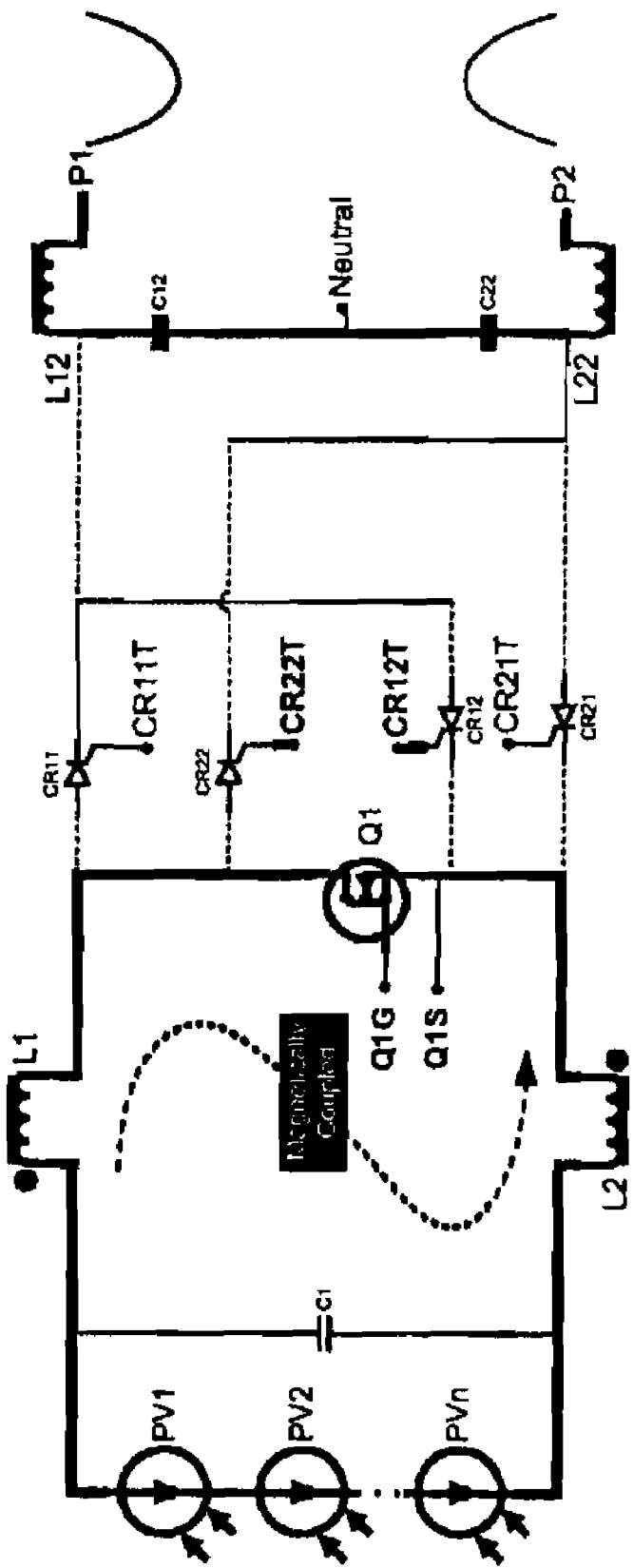
FIG. 7 shows a pulse amplitude modulated current converter with a transistor completing the circuit to charge inductors while reconstruction filters produce current pulses for the grid negative half phase.
Figure 8:
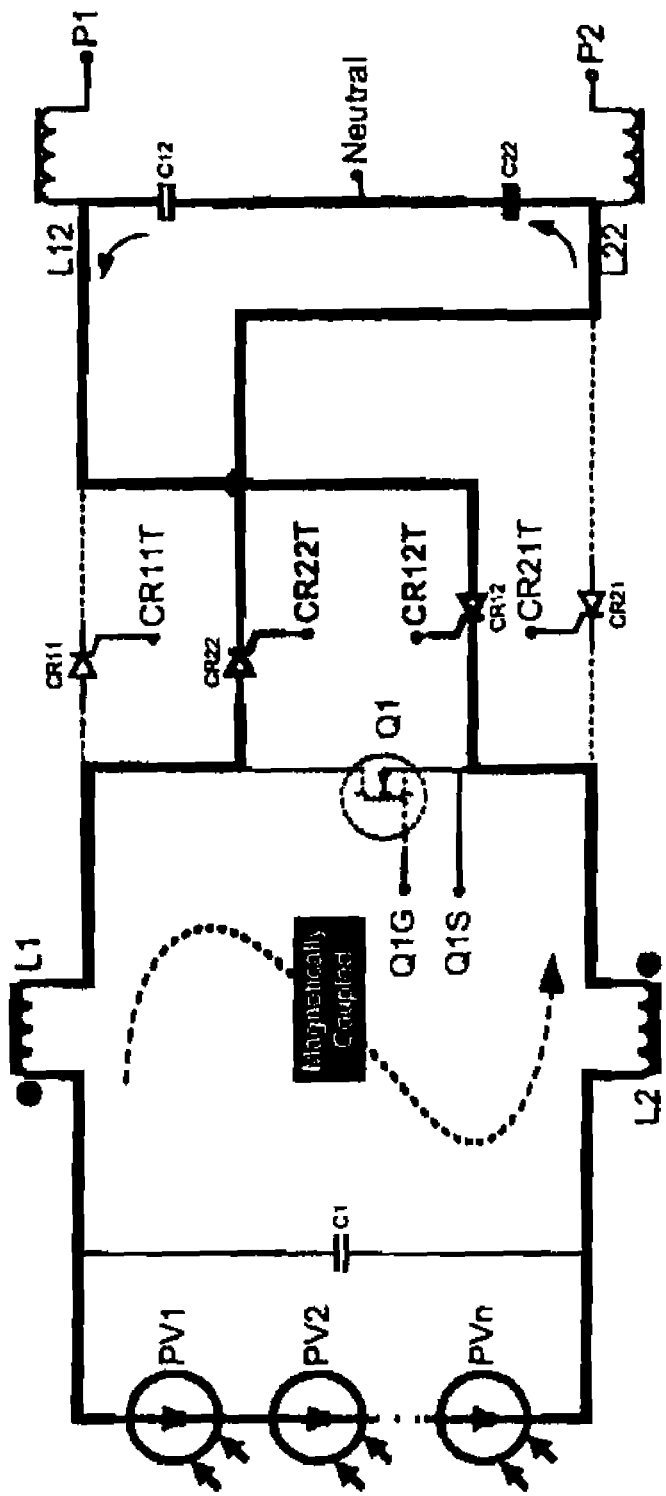
FIG. 8 shows a pulse amplitude modulated current converter with current flowing through into the reconstruction filters for the grid negative half phase.

Referring to FIG. 6, with L 1 406 and L 2 405 charged Q 1, 404 is turned off for a pulse width modulated time. After the off time has expired, Q 1 404 is turned on until the end of the instant current switching cycle. During the time that Q 1 404 is off, current previously stored in L 1 406 and L 2 405 together with the current flowing in PV 401 is applied to the input terminals of CR 12 425 and CR 22 423 which remain enabled by signals CR 22 T 420 and CR 12 T 421 for the entire negative half cycle of the grid. The negative half cycle of the grid is defined as the condition wherein the voltage at terminal P 1 434 is less than the voltage at terminal P 2 436. The charge in the current pulse delivered through the SCR CR 22 423 is initially stored on capacitor C 22 440, creating a voltage more positive on the near end of coil L 22 431 relative to the end connected to terminal P 2 436. The charge in the current pulse delivered through CR 12 425 is initially stored on C 12, a voltage more positive on the near end of coil L 12 430 relative to the end connected to terminal P 1 434. This is the initial condition for both reconstruction filter comprising L 12 430, C 12 438 and reconstruction filter comprising L 22 431, C 22 440. At this point the reconstruction filters will transform the pulse width modulated current pulse delivered to them to a pulse amplitude modulated half sine wave of current delivered to the grid as shown in FIG. 6.

The reconstruction filters for Case 2 are the same components as described in association with Case 1; their design and operation are not repeated here.

The off time of Q 1 404 is modulated such that the width of current pulses produced is in the shape of the grid sine wave. The reconstruction filters transform this sequence of pulse width modulated current pulses into a sequence of pulse amplitude modulated current pulses whose amplitude follow corresponding points of the shape of the grid sine wave.

So long as the grid half cycle remains negative, with the voltage of terminal P 1 434 more negative than the voltage of terminal P 2 436, further current pulses are produced by repeating the process described hereinbefore, beginning at "CASE 2: PWM modulation for negative half wave of grid."

The positive zero crossing of the grid voltage is defined as the condition wherein the voltage at terminal P 1 434 is equal to P 2 436 after the voltage at terminal P 1 434 has been more negative than the voltage of terminal P 2 436. Prior to the positive zero crossing, Q 1 404 is turned on, removing current from SCRs CR 12 425 and CR 22 423. At this point the signals CR 12 T 421 and CR 22 T 420 are de-asserted, preventing SCRs CR 12 425 and CR 22 423 from conducting current during the grid positive half cycle. After the positive zero crossing with P 1 434 more positive than P 2 436, signals CR 11 T 419 and CR 21 T 421 are asserted, enabling SCRs CR 11 424 and CR 21 426 to conduct when current is applied to them.

The positive zero crossing of the grid voltage is defined as the condition wherein the voltage at terminal P 1 434 is equal to P 2 436 after the voltage at terminal P 1 434 has been more negative than the voltage of terminal P 2 436. Prior to the positive zero crossing, Q 1 404 is turned on, removing current from SCRs CR 12 425 and CR 22 423. At this point the signals CR 12 T 421 and CR 22 T 420 are de-asserted, preventing SCRs CR 12 425 and CR 22 423 from conducting current during the grid positive half cycle. After the positive zero crossing with P 1 434 more positive than P 2 436, signals CR 11 T 419 and CR 21 T 421 are asserted, enabling SCRs CR 11 424 and CR 21 426 to conduct when current is applied to them.

With the grid again positive, the process would again return to the process described hereinbefore, beginning with the section labeled CASE 1: PWM modulation for positive half wave of the grid.

Figure 9:
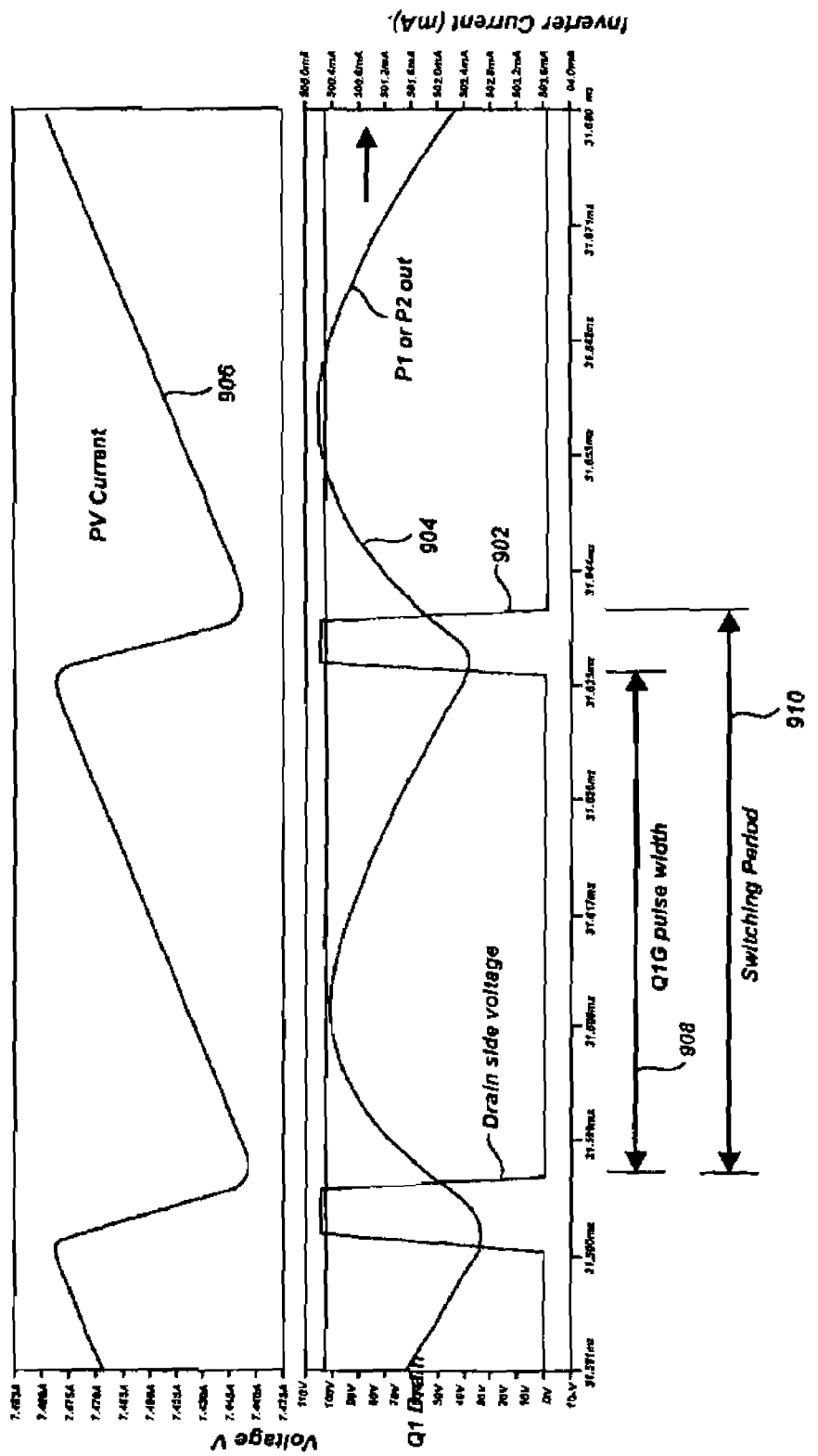
FIG. 9 relates the timing of drive signals and current.

FIG. 9 shows a signal diagram of the results of the conversion of a pulse width modulated pulse, translated into a pulse amplitude modulated (PAM) current pulse by a reconstruction filter, such as those previously disclosed hereinbefore (L 12 430 and C 12 438; L 22 431 and C 22 440). The short duration roughly rectangular voltage pulses 902 are the voltage on the drain side 451 (FIG. 4) of Q 1 404. The pulse width labeled 908 approximates the pulse width of the signal Q 1 G on line 411 (FIG. 4) and the period 910 is the switching period of the PAMCC 400. This voltage drives the transformer 407 and PV 401 currents through a SCR CR 11 424 or CR 12 425 (depending upon the instant status of the control signals from controller 412, as previously described) into the input of one of the reconstruction filters. The rounded half wave rectified sine wave 904 is the output of the reconstruction filter. As the pulse width 908 (approximately) of the input pulse increases, the amplitude of the output wave form 904 increases. The triangular wave form 906 at the top of the graphs plots the variation of current through PV 401 during the common window of time. Trace 906 shows the effect of transformer 407 in maintaining a relatively constant PV 401 current, independent of the relatively large pulse width modulated current pulses provided to the reconstruction filters.

Figure 10:
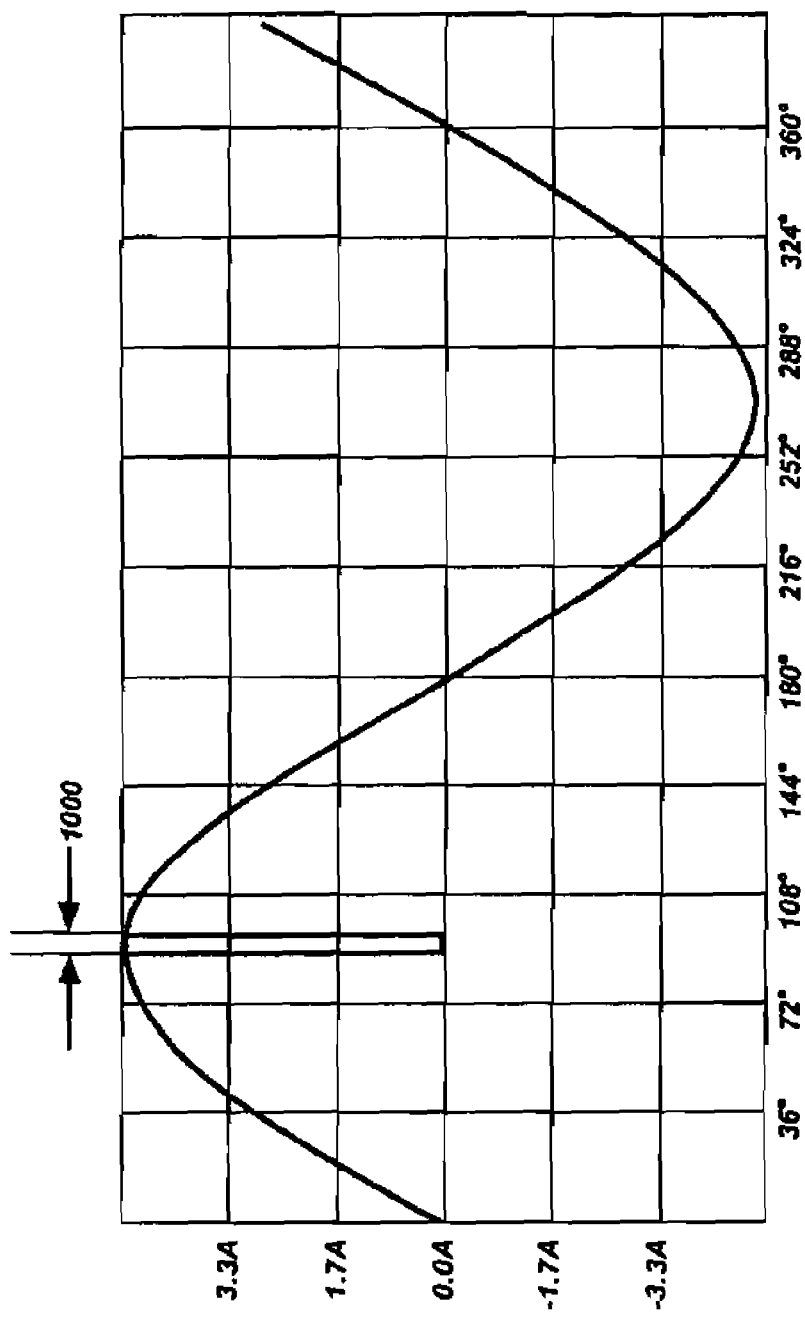
FIG. 10 shows what portion of current in a sine wave of current will be examined in detail in some following drawings.
Figure 11:
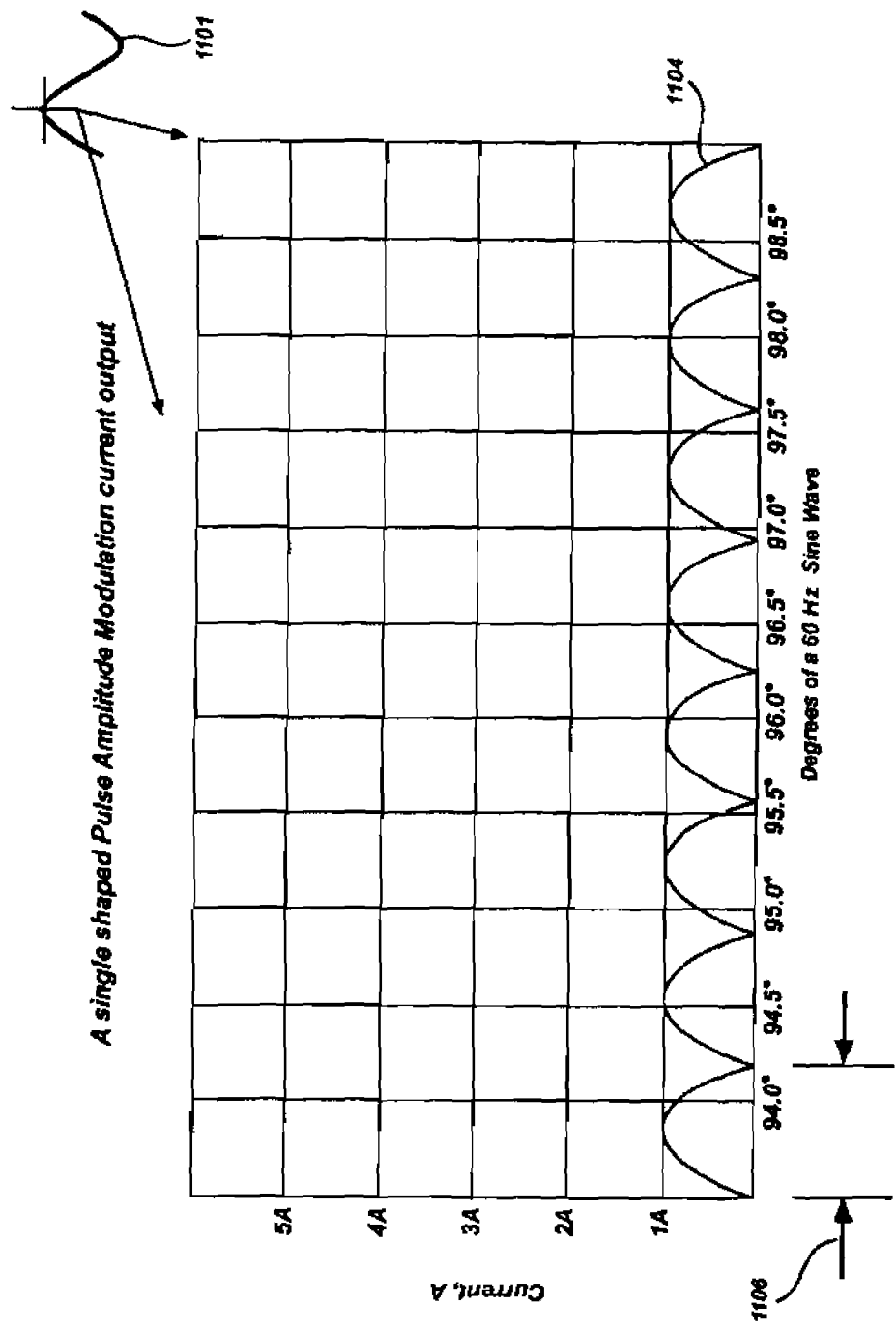
FIG. 11 shows the pulses provided by a single pulse amplitude modulated current converter.
Figure 12:
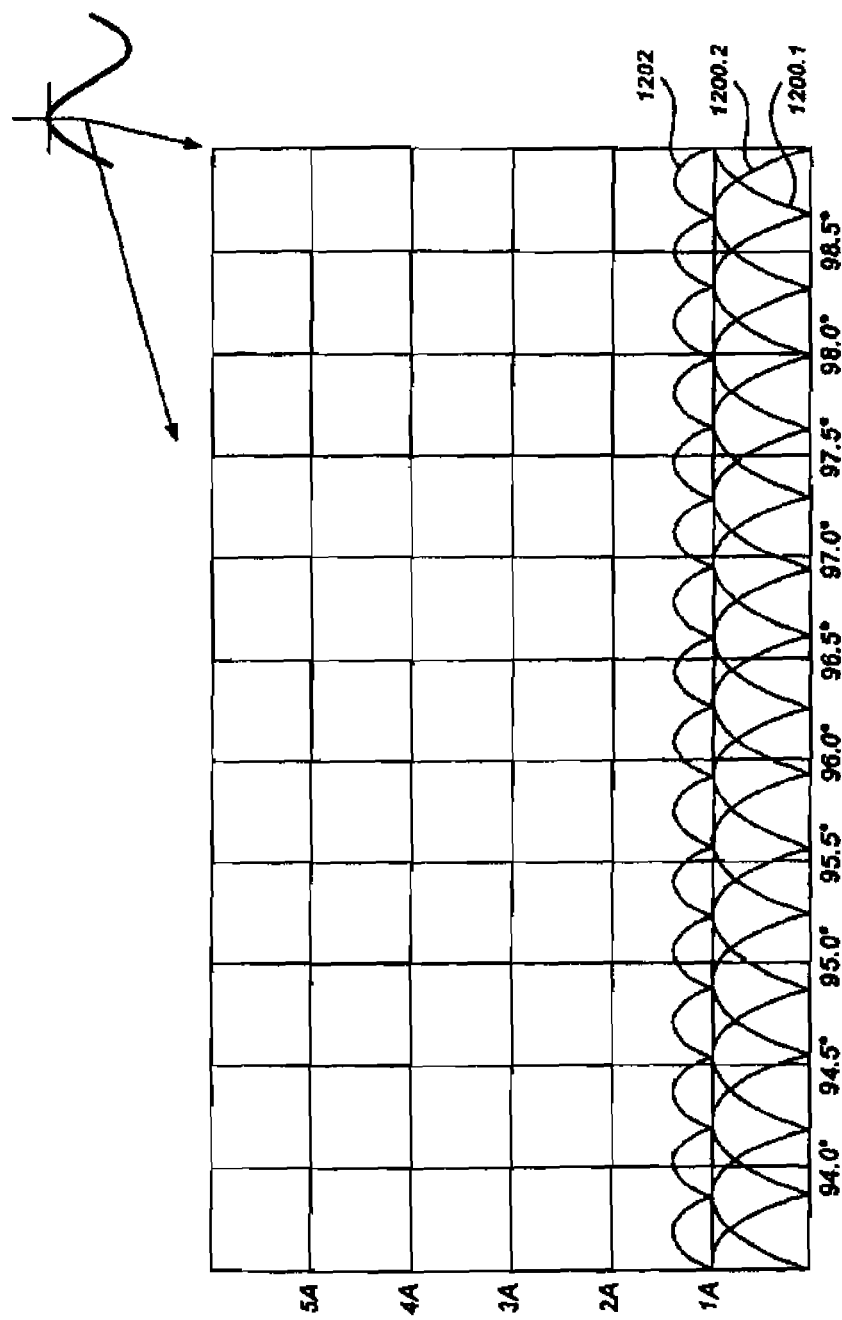
FIG. 12 shows the pulses provided by two pulse amplitude modulated current converters and their total, summed current.
Figure 13:
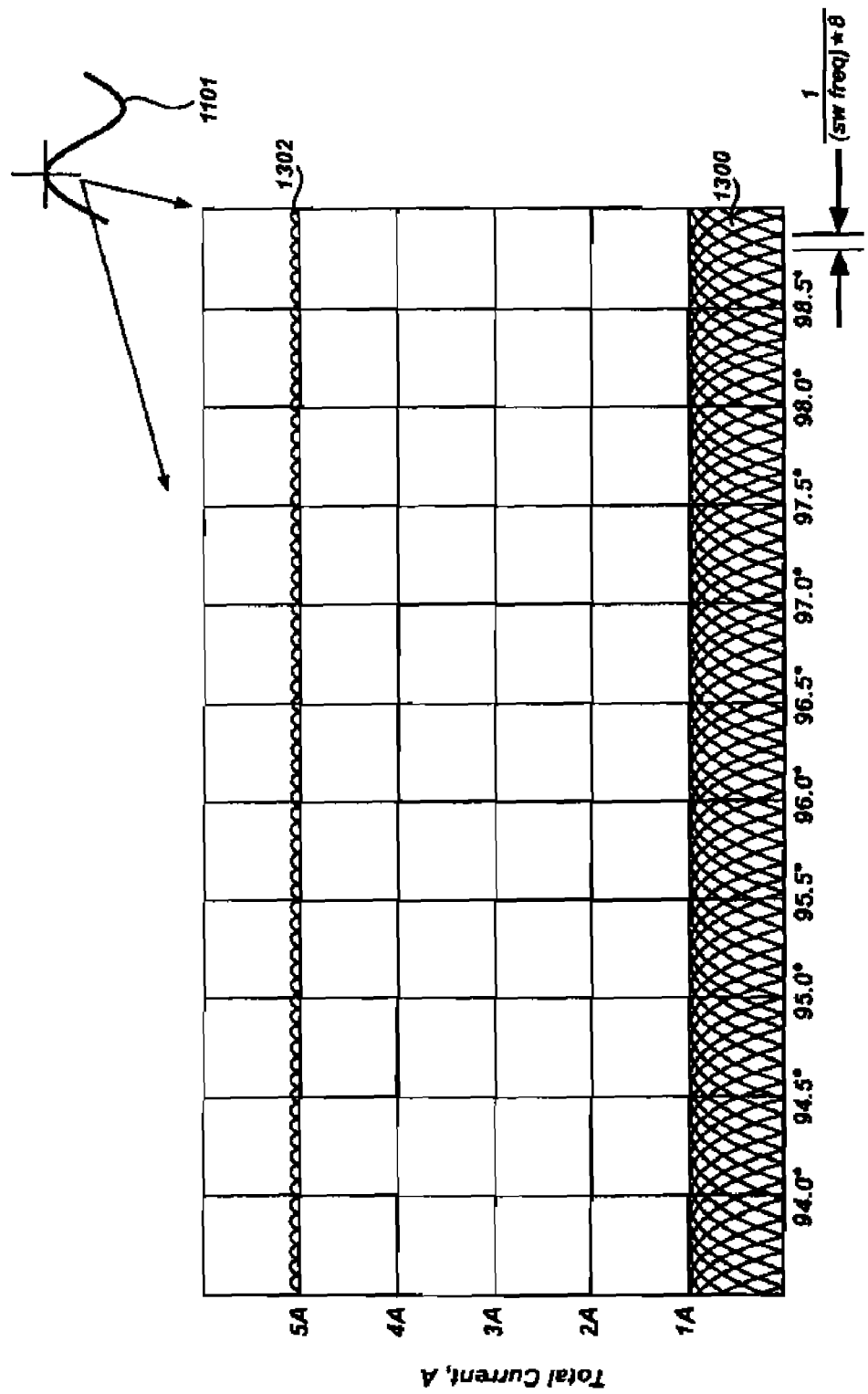
FIG. 13 shows the pulses provided by eight pulse amplitude modulated current converters and their total, summed current.

FIG. 10 indicates the narrow time slice of a grid sine wave cycle to be depicted in FIGS. 11, 12 and 13.

FIG. 11 shows the pulse amplitude modulated output current of a single PAMCC 400. Note that the amplitude shown is for a small portion of time near the positive peak of the grid voltage as indicated on the cycle example 1101. The individual pulses 1104 have a period 1106 equal to the period of the switching frequency, for example (1/30 KHz).

In FIG. 12, two individual currents (1200.1 and 1200.2) of two PAMCCs (each in accordance with the PAMCC 400) are phased apart one half of the period of the switching frequency. The trace 1202 above is the sum of the two PAMCC output currents 1200.1 and 1200.2. Note that the summed current 1202 has a much smaller ripple than the ripple of a single PAMCC (see FIG. 11) and has twice the ripple frequency as of the ripple frequency of a single inverter. The summed current 1202 does not return to zero.

Following on the summation of the currents of two PAMCC 400 outputs, FIG. 13 shows the individual output currents of eight PAMCCs (the line 1300 is representative; each waveform is not numbered), each phased evenly across the period of the switching frequency. For example for a system using a 30 KHz switching frequency, the period is 33.3 microseconds and each phase is delayed by (33.3/8), or 4.167 microseconds, relative to the previous output current waveform. Any number of PAMCCs 400 may be so summed. As the number summed increases they are each phase delayed by a smaller number (1/(switching frequency)*n) where "n" is the number of PAMCCs summed. Note that the summed current shown in FIG. 13 has only a fraction of the ripple current of an individual PAMCC (FIG. 12) and has eight times the ripple frequency of that of an individual PAMCC. If each PAMCC 400 is producing a point on a grid sine wave with its sequence of PAM current pulses, phasing and summing a set of PAMCCs, forming an array of converters, will effectively demodulate a grid sine wave of current with very high accuracy and very low noise (ripple). Any number of array converters may be phased and summed in this way. As the number of PAMCCs is increased, the ripple amplitude decreases and the ripple frequency increases. In one embodiment two or more of the plurality of PAMCC 400 individual output currents are in phase with each other. In some embodiments the switching frequency is selected so as to be unrelated to the grid frequency, for example 60 Hz in the United States, the ripple will not represent harmonic distortion. Signals modulated onto the PAMCC output are arbitrary. In some embodiments multiple signals are modulated onto the PAMCC output, wherein one of such signals may, for example, provide for communication between an arbitrary two or more PAMCC modules. The PAMCC modulation is sometimes used to correct for distortion in the grid signal.

One of several ways to choose the phasing of the arrayed PAMCCs 400 is for each PAMCC 400 to be pre-assigned a timing slot number, with the first slot being scheduled following a zero crossing and each PAMCC 400 firing its PAM signal in the predetermined (i.e., assigned) sequence.

Figure 14:
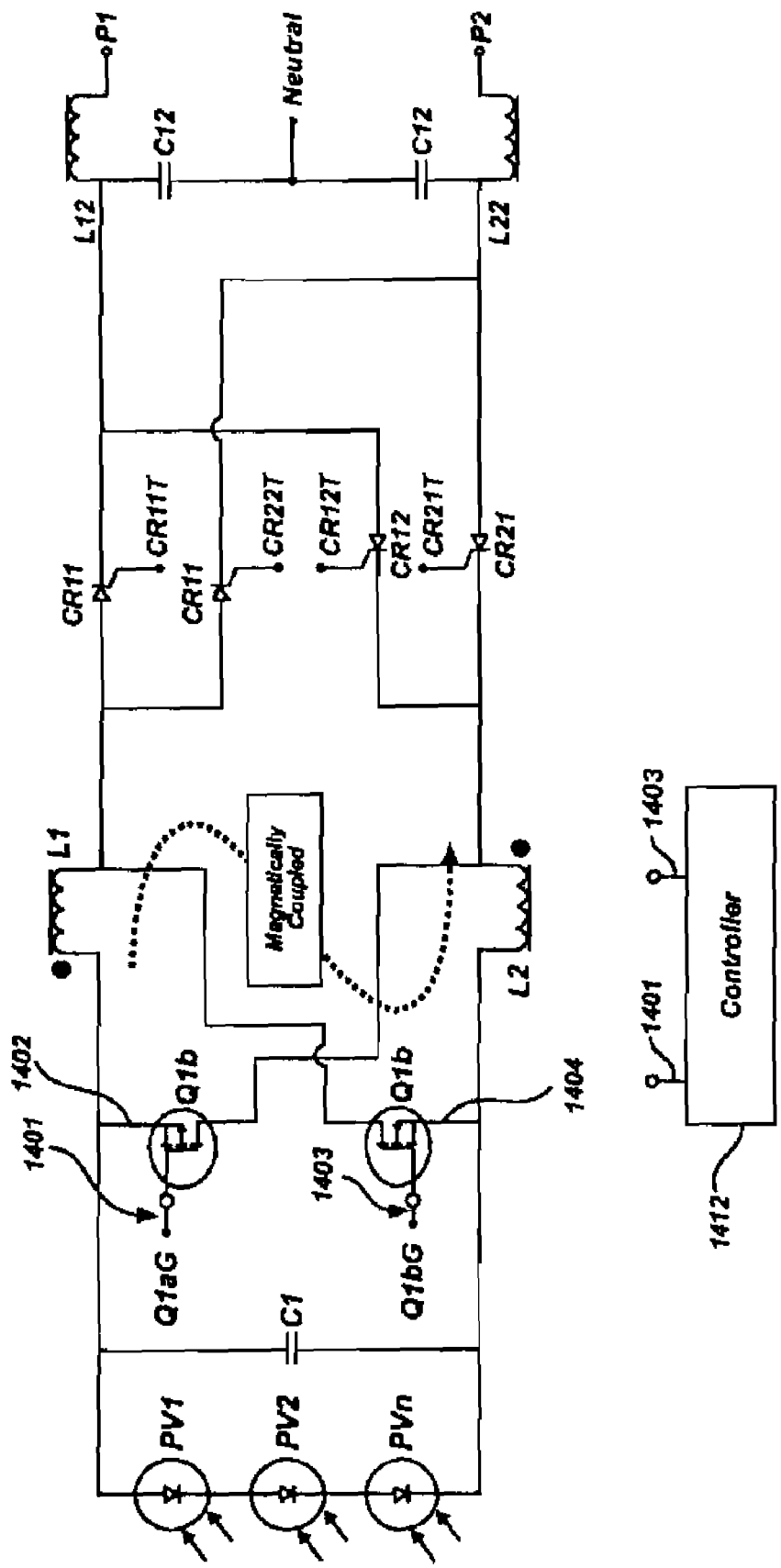
FIG. 14 shows an alternative circuit for a single pulse amplitude modulated current converter.

In an alternative embodiment, exemplified in FIG. 14, a second transistor is added, wherein Q 1 A 1402 and Q 1 B 1404 replace the single transistor Q 1 404 as was shown and described in the circuit of FIG. 4. Using the two transistors Q 1 A 1402 and Q 1 B 1404 provides some potential advantages, including reducing the voltage across each transistor, allowing a more relaxed Rds_on (the "on" resistance) requirement for each transistor compared to the Rds_on requirement of Q 1 404, and allowing each transistor to be driven with respect to the relatively low voltage and stable anode and cathode ends of PV 401. In this configuration, Q 1 A 1402 and Q 1 B 1404 are both turned on and off at the same times as with Q 1 404 in the previous discussion. All other aspects of the circuit operation remain the same. Q 1 A 1402 and Q 1 B 1404 are of different transistor types, so separate signals to their control gates are provided by the control 1412. Controller 1412 is otherwise the same as controller 412 of FIG. 12, with the addition of output terminals connected to the control gates of Q 1 A 1402 and Q 1 B 1404 via lines 1401 and 1403 respectively.

Figure 15:
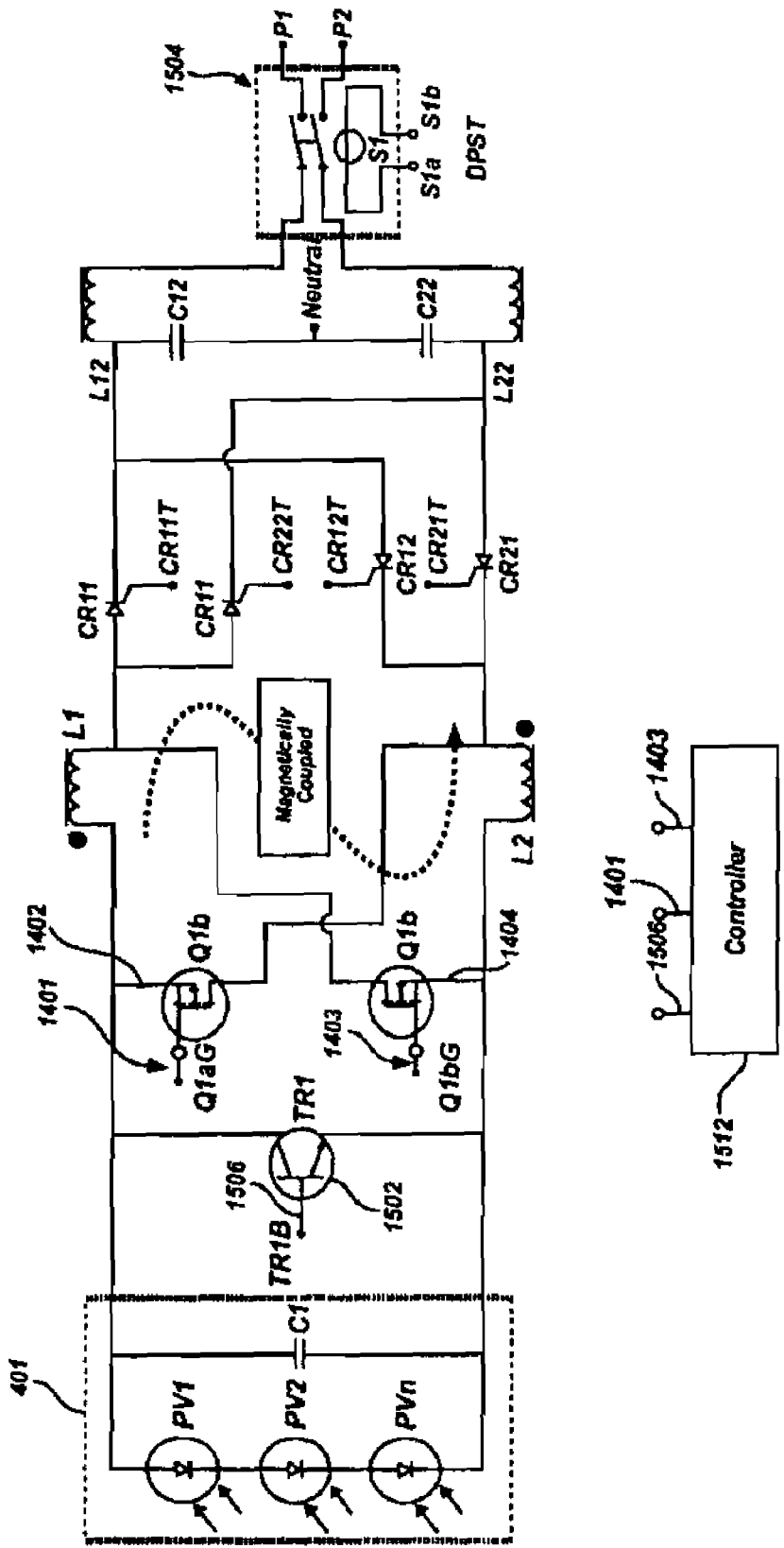
FIG. 15 shows a circuit for a single pulse amplitude modulated current converter wherein the converter can be disabled.

In some embodiments the system may be shut down for safety, maintenance, or other purposes. One example of a shut-down method is shown in FIG. 15. A transistor TR 1 1502 and a relay S 1 1504 are added as shown. Note that this example includes the two transistors Q 1 A 1402 and Q 1 B 1404, however the same shut-down provision can be added to the circuit of FIG. 4, wherein the two transistors Q 1 A and Q 1 B are replaced by the single transistor Q 1 404. Transistor TR 1 1502 and relay S 1 1504 provide for the safe shutdown of PAMCC while connected to PV 401, which is illuminated and producing power. The shutdown process is initiated by providing a signal TR 1 B from controller 1512 on a line 1506, the line 1506 connected to the control gate of the transistor 1502. When transistor TR 1 1502 turns on, TR 1 creates a short path for current produced by PV 401, which results in the voltage across PV 401 to be reduced to a small level. At this point, Q 1 A 1402 and Q 1 C 1404 are energized to allow the currents in the coils L 1 406 and L 2 405 to fall to a low level. After the coils L 1 and L 2 are discharged, relay S 1 1504 is opened. With the path to the grid now open, Q 1 A 1402 and Q 1 B 1404 are turned off, followed by turning off transistor TR 1 1502. In this configuration, no further power will be produced.

As disclosed in U.S. patent application Ser. No. 12/061,025 and above, a direct current to pulse amplitude modulated ("PAM") current converter, denominated a "PAMCC", is connected to an individual source of direct current. The PAMCC receives direct current and provides pulse amplitude modulated current at its output. When the PAMCC's output is connected in parallel with the outputs of similar PAMCCs an array of PAMCCs is formed, wherein the output pulses of the PAMCCs are out of phase with respect to each other. An array of PAMCCs form a distributed multiphase inverter whose combined output is the demodulated sum of the current pulse amplitude modulated by each PAMCC. A PAMCC is also termed an "array converter."

By way of discussion, an array converter will be assumed to be employed to control a solar panel, though the method of the present invention may be practiced with any electronic module that includes the ability to measure voltage and current, to determine the temperature of the panel, to communicate with other similar modules in a common system, and to control a photovoltaic panel. Some embodiments further include the ability to communicate to a central office, for example via an internet connection or a radio transmission.

According to the present invention, array converter modules are mechanically attached and electrically connected to individual photovoltaic modules. The combined assembly is subjected to I/V flash testing. The values of Voc, Isc, Vmp, Rs, and Rsh parameters are recorded during the flash test of the module. These module-specific parameters as well as temperature coefficients and maximum tolerable reverse bias voltage for the specific combination of cell and module technology are programmed into the array converter's non-volatile memory before the unit is shipped.

A maximum power point tracking algorithm ("MPPT") periodically adjusts the current drawn from the photovoltaic module such that the module voltage times current product (VI) is maximized. The MPPT algorithm also makes an initial estimate of where the voltage for maximum power, "Vmp", should be based on temperature, current, and the manufacturing parameters for the instant module and other factors. The accuracy of the Vmp estimate is primarily determined by the accuracy of the temperature sensing circuit.

The value of Vmp changes over time due to long-term ageing effects of the photovoltaic cell and deterioration of the module laminates and interconnect. In one embodiment, to calibrate the corresponding changes to Vmp over time, the array converter maintains historical data correlating Vmp to module temperature. This correlation is done based on local observations within the photovoltaic module associated with its attached array converter as well as comparative correlation with neighboring photovoltaic modules in the same system. In some embodiments the data is communicated to a remote facility, wherein the remote facility has means to store the historical data and perform analysis using the stored data.

Figure 16:
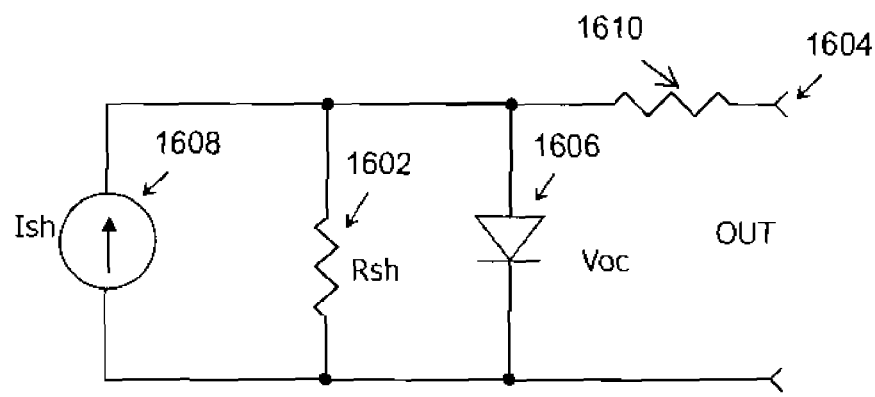
FIG. 16 is an electrical model of a typical solar panel.

FIG. 16 is an electrical model of a photovoltaic panel or cell. In a useful solar cell, Rsh 1602 must be large enough that useful current is available at Out 1604 when the voltage across diode Voc 1606 is near the forward conduction voltage of diode Voc 1606. Typically it is desirable that no more than 1% of the current at Out 1604 be lost to Rsh 1602 when operating close to the forward conduction voltage of Voc. For example, if current source Isc 1608 were 10 Amps when illuminated to 1 sun and the forward conduction voltage of Voc 1606 were 0.5V, then it would be typical to design the cell so that Rsh 1602 is >(0.5V/(10 A*1%)) or 0.5V/0.1 A. Rsh 1602 should be greater than 5 ohms. Cells optimized for high efficiency or low light often have Rsh 1602 values many times higher.

In a useful solar cell, Rs 1610 must be small enough that useful voltage is available at Out 1604 when the voltage across diode Voc 1606 is near the forward conduction voltage of diode Voc 1606. Typically it is desirable that no more than 1% of the current be lost to Rs 1610 when operating close to the forward conduction voltage of Voc 1606. For example, if current source Isc 1608 were 10 Amps when illuminated to 1 sun and the forward conduction voltage of Voc 1606 were 0.5V then it would be typical to design the cell so that Rs 1610 is <((0.5V*1%)/10 A) or 0.005V/10 A. Rs 1610 should be less than 500 micro ohms. Cells optimized for high efficiency in bright light often have lower Rs 1610 values lower than 500 micro ohms.

For the reasons above, useful solar cells have Rsh 1602 values that are many orders of magnitude higher than Rs 1610. In the example given, Rsh 1602 is a minimum of 1,000 times higher than Rs 1610, given a design requirement that no more than 1% be lost due to each.

Figure 17:
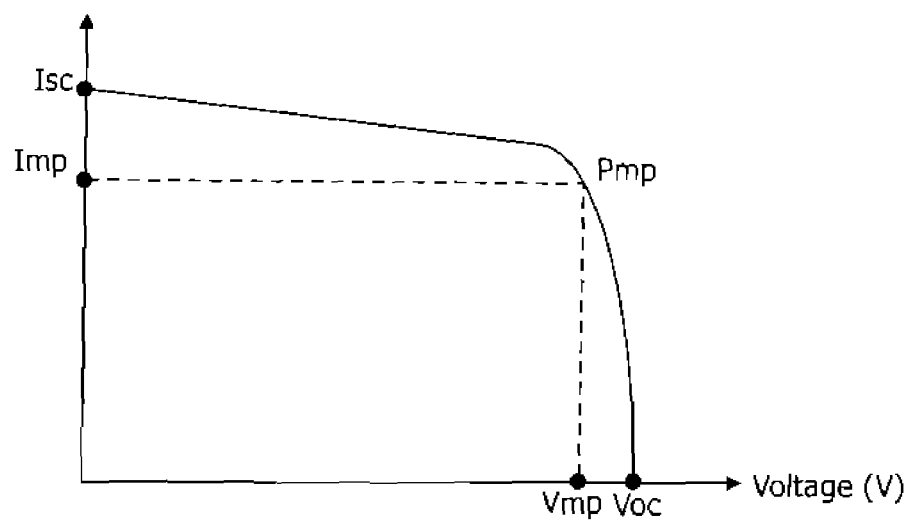
FIG. 17 is a graph of the relationship between voltage, current, and maximum power point for a typical solar panel.
Figure 18:
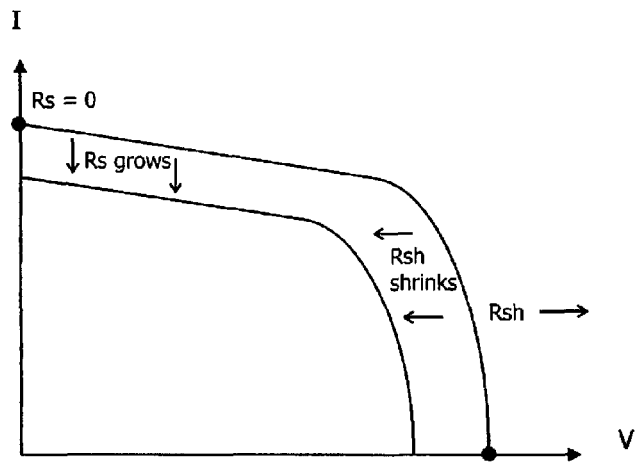
FIG. 18 shows the effect of increasing series resistance, Rs, and reduction of shunt resistance, Rsh, on the shape of an I-V curve for a typical solar panel.

FIG. 17 illustrates the relationship between voltage and current at a given instant for a typical photovoltaic panel or cell. Long term degradation in power output from a photovoltaic cell or module manifests itself through an increase in series resistance, Rs 1610, or a reduction of the shunt resistance, Rsh 1602. Changes in Rs 1602 and Rsh 1602 result in an alteration of the I-V curve as illustrated in FIG. 18. An increase in series resistance results in a more acute negative slope on the top part of the I-V curve to the left of the maximum power point. An increase in shunt resistance results in a more acute negative slope on the right part of the I-V curve to the right of the maximum power point. The absolute value of Rs 1610 is determined by measuring a few points on the flat portion of the I-V curve close to Isc and computing the slope of the straight line intersecting these points. The absolute value of Rsh 1602 is similarly determined by measuring a few points of the flat portion of the I-V curve close to Voc and computing the slope of the straight line intersecting these points.

Figure 19:
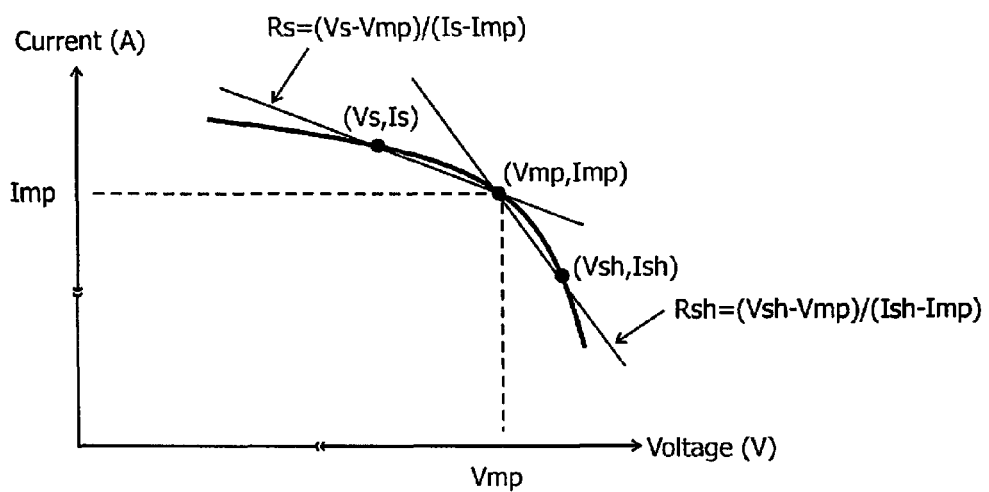
FIG. 19 is an exploded view of a graph of voltage and current for a typical solar panel in the region of the maximum power point.

Increasing Rs 1610 and decreasing Rsh 1602 will also result in the knee of the I-V curve around the Vmp point to become flattened. As a result, in some embodiments relative changes in Rsh 1602 and Rs 1610 are determined by measuring impedance changes close to the maximum power point. Looking to FIG. 19, a proportional value of Rs 1610 is computed by measuring the impedance immediately to the left of the maximum power point. The impedance can be computed by the formula $$\text{Impedance} = dV/dI = (Vs - Vmp)/(Is - Imp)$$

where dI is determined by increasing the instantaneously drawn current in a controlled fashion and subtracting the Imp current from the new current. Since Rsh 1602 is so much larger then Rs 1610, Rs 1610 may be neglected when a load is placed at Out 1604 such that the voltage at Voc 1606 is well below the forward conduction voltage of diode Voc 1606. In this case changes in the load will result in changes in voltage proportional to Rsh 1602 with the current through Rs 1610 nearly constant and therefore the voltage drop across Rs 1610 nearly constant. If one divides the change in voltage by the change in current with the application of two different loads such that the voltage at Voc 1606 is well below the forward conduction point of Voc 1606 then the result of the division will be close to Rsh 1602.

A similar procedure is followed to compute Rsh 1602, where the difference being the instantaneously drawn current is decreased in a controlled fashion and impedance found using $$\text{Impedance} = (dV/dI) = (Vsh - Vmp)/(Ish - Imp).$$

Since Rs 1610 is so much smaller then Rsh 1602, Rsh 1602 may be neglected when a load is placed at Out 1604 such that the voltage at Voc 1606 is well above the forward conduction voltage of diode Voc 1606. In this case changes in the load will result in changes in voltage proportional to Rs 1610 with the voltage across Rsh 1602 nearly constant and therefore the current through Rsh 1602 nearly constant. If one divides the change in voltage by the change in current with the application of two different loads such that the voltage at Voc 1606 is well above the forward conduction point of Voc 1606 then the result of the division will be close to Rs 1610.

The maximum power point tracking algorithm operates by the principle of "perturb and observe". The algorithm periodically alters the current draws from the photovoltaic module and observes the voltage at the new operating point through direct measurement. This process of perturb and observe can typically be operated several hundred times each second. A control algorithm uses the periodic data measurements to find the operating point corresponding to the maximum power point. Once the algorithm has found the maximum power point, it continuously searches for changes in close proximity to the maximum power point. The voltage and current measurements required to compute impedances proportional to Rs 1610 and Rsh 1602 are a direct byproduct of the maximum power point tracking algorithm. The proportional impedance is averaged over a longer period of time. Average photovoltaic module performance degradation due to ageing is typically on the order of 0.5% to 1% per year. In some embodiments short term averaging of the proportional Rs 1610 and Rsh 1602 impedance measurements are performed within the array converter. A short term average is typically on the order of 15 minutes. Longer term averages on the order of months, quarters, or years can also be performed within the array converter. Alternatively, the short term averages can be communicated by individual array converters to a central data processing and storage facility, where the long term averages can be computed and saved.

In some embodiments the continuous energy output, temperature data, and proportional Rs 1610 and Rsh 1602 impedance measurements from a photovoltaic module equipped with an array converter are communicated to and analyzed by a central data processing facility. The central data processing facility maintains historical performance data for each individual photovoltaic module equipped with an array converter. If a specific module experiences an energy output reduction relative to its neighboring modules or other modules showing previous long term correlated performance, the relative degradation can be caused by a) external obstruction such as shading or soiling of the photovoltaic module or b) an ageing related degradation resulting in increasing Rs 1610 or decreasing Rsh 1602. Continuous measurements of proportional Rs 1610 and Rsh 1602 impedances provides the means to differentiate whether the differentially reduced energy output was caused by inherently degraded photovoltaic module performance or by external factors.

The values of voltage and current at the maximum power point are sensitive to Rs 1610, Rsh 1602 and the forward conduction characteristic of Voc 1606. At this point the fact that the forward current in the junction of diode Voc 1606 is really an exponential in the change of voltage across the diode and strongly influenced by temperature is most evident. In some technologies, several diode characteristics superimposed may be observed. This means that after the maximum power point has been established, its voltage and current at a particular temperature is a sensitive indicator of changes within the cell.

A degradation in photovoltaic module performance due to external obstructions caused by shading or soiling never manifests itself uniformly across all the cells in the photovoltaic module. As a result the cells in the photovoltaic module subjected to shading or soiling will produce less current than the other cells in the module. This will result in the unaffected cells trying to force the degraded cell to operate in reverse bias conditions. Since the array converter continuously measures the module temperature and is aware of the voltage related temperature coefficient for the specific photovoltaic module it can determine if some cells in the module show degraded performance, described in more detail in previously referenced U.S. patent application Ser. No. 12/335,357. The presence of partial shading or soiling can therefore be deterministically detected. An array converter equipped photovoltaic module can communicate that is has detected the presence of partial shading or soiling and report this information to the central data processing facility. If the partially degraded performance is temporal in nature it is caused by shading. If the partially degraded performance is continuous it is caused by soiling. This can be determined by the central data processing facility by analyzing the performance trend of each individual photovoltaic module.

If the maximum power point is seen to shift away from its historical norms for a given panel, the regions above and below the voltage recorded at the maximum power point may be measured by changing the load above and below the maximum power point to measure Rsh 1602 and Rs 1610 as previously discussed. In one embodiment, if a photovoltaic module shows signs of accelerated degradation of Rs 1610 or Rsh 1602 the central data processing facility issues a request for diagnostic measurements from the suspected panel. While in diagnostic measurement mode the array converter samples the complete I-V curve of the photovoltaic module. These diagnostic I-V measurements allow for the computation of the absolute Rs 1610 and Rsh 1602 values to confirm the exact magnitude of the Rs 1610 and Rsh 1602 degradation. It is also possible to perform these diagnostic measurements on a periodic basis to further improve the detection accuracy of ageing degradation relative to alarm thresholds. The drawback with diagnostic I-V measurements compared with relative impedance measurements is that diagnostic I-V measurements result in energy yield reduction during the diagnostic time period.

If Rsh 1602 is found to be smaller than it once was, we conclude that the cell's leakage has increased, a definitive sign of damage within the cell.

If Rs 1610 is found to be higher than it once was, we conclude that the cell's resistance has increased or the interconnect to the cell has been degraded. Either way, this is also a definitive sign of damage.

If Rsh 1602 and Rs 1610 are found to be at their nominal values then we conclude that the voltage characteristic of the diode junction itself has been degraded. This is also a definitive sign of damage.

It should be noted that merely reducing the light available to a cell does not change Rs 1610, Rsh 1602 or the diode's conduction characteristic. The only significant effect is to reduce the current from Isc 1608. This would result in a shift in the maximum power point that was on the conduction characteristic as seen through an unchanged diode conduction characteristic, a definitive sign that the cell was not damaged.

Once we have established that the cell is not damaged, we move from device defect concerns to maintenance or metrological issues. If a panel including the instant cell is producing differently than other nearby panels we conclude that this particular panel is either shaded or dirty. If power production is lower but follows the standard profile of solation of the other panels then we conclude it is dirty. If the pattern is different then we conclude the panel is shaded. If every panel has a reduced production that follows the standard profile of solation for a particular site and the production is seen to be poor independent of changes in cloud cover over time as observed by publicly available weather satellite imagery for the site, we conclude that the entire site needs to be cleaned.

Figure 20:
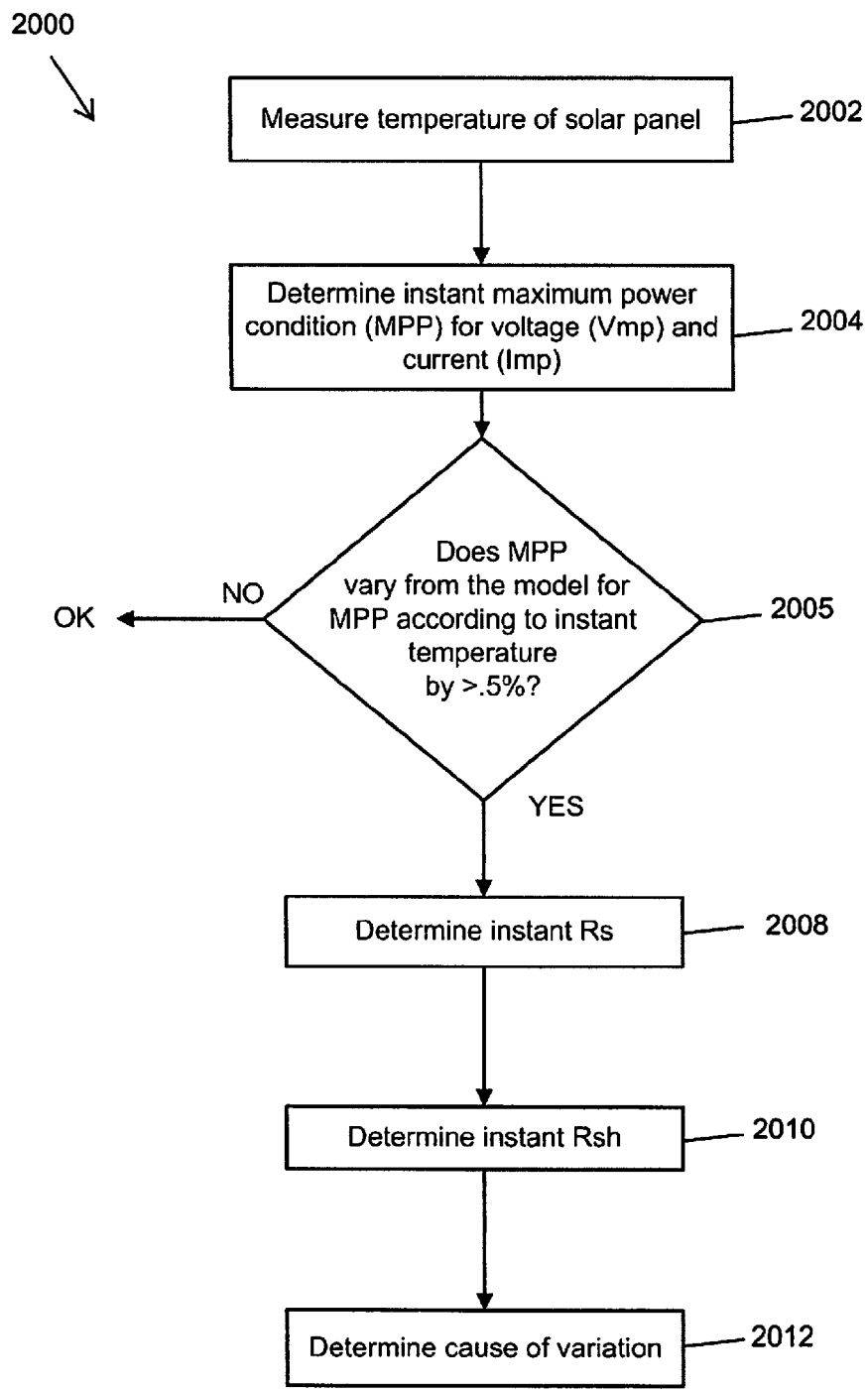
FIG. 20 is an example of one embodiment of the method of the present invention.

FIG. 20 illustrates an embodiment method 2000. In step 2002, the temperature of the solar panel may be measured. In step 2004, the instant maximum power point is determined. If the maximum power point does not vary from the model by more than 0.5% (i.e. determination step 2005=NO), the method ends. If the maximum power point does not vary from the model by more than 0.5% (i.e. determination step 2005=YES), the instant Rs may be determined in step 2008 and the instant Rsh may be determined in step 2010. In step 2012, the cause of the variation is determined.

From the above discussion, it is clear that the technique of measuring and comparing Rs 1610, Rsh 1602 and the maximum power point allows one to separate internal damage from external effects. Further, by examining the differential performance of panels in an array of panels and utilizing publicly available metrological data, one can deduce the nature of the external factor. By being able to distinguish between damage which would typically require replacement of a panel to correct and dirt or shading which would require cleaning, pruning or other maintenance actions, the correct service solution may be provided without need of additional truck rolls, expense and delays.

RESOLUTION OF CONFLICTS

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

What is claimed is:

1. A method for determining the operating condition of a solar panel, wherein the solar panel is controlled by an electronic module, comprising the steps of:
    measuring a temperature of the solar panel;
    determining the instant maximum power condition of the solar panel;
    selecting a condition of voltage and a condition of current that correspond to the instant maximum power point condition;
    controlling the solar panel to provide the selected condition of voltage and condition of current;
    comparing the instant maximum power condition to a model based upon the temperature and previously determined values for series and shunt resistances of the solar panel; and
    if the instant maximum power condition varies from the model by more than a predetermined value, taking the additional steps of:
        determining the instant series resistance of the solar panel;
        determining the instant shunt resistance of the solar panel; and
        determining the cause of the variance from the model according to a rule,
        wherein the rule determines that a solar panel is shaded if the solar panel is not damaged and further that power production of the solar panel is dissimilar to other nearby solar panels in a solar panel system.

2. The method according to claim 1, wherein determining the maximum power condition comprises the steps of:
    varying voltage and current relative to the instant values for voltage and current;

recalculating power output; and
selecting the condition of voltage and current that provides the highest power value.

3. The method according to claim 1, wherein the previously determined values for series and shunt resistances are determined by a manufacturer of the solar panel by testing after assembly of the solar panel.

4. The method according to claim 1, wherein the previously determined values for series and shunt resistances are the values determined in a previous measuring cycle.

5. The method according to claim 1, wherein the rule determines that a solar panel cell is damaged if the shunt resistance value is smaller than the previous shunt resistance value.

6. The method according to claim 1, wherein the rule determines that a solar panel cell is damaged if the series resistance value is larger than the previous series resistance.

7. The method according to claim 1, wherein the rule determines that a solar panel cell is damaged if the series resistance value and the shunt resistance value are both the same as their previous values.

8. The method according to claim 1, wherein the rule determines that a solar panel is dirty if the power production of the solar panel is lower than the other nearby solar panels and the solation pattern of the solar panel is similar to the solation pattern of the other nearby solar panels.

9. The method according to claim 1, wherein the values of temperature, maximum power voltage, maximum power current, series resistance, and shunt resistance are communicated to an outside data storage facility.

10. The method according to claim 9, wherein the communication is via an internet connection.

11. The method according to claim 9, wherein the communication is via a radio signal.

12. The method according to claim 1, wherein the variation of the instant maximum power condition is more than 0.5 percent.

13. A method for determining the operating condition of a solar panel, wherein the solar panel is controlled by an electronic module, comprising the steps of:
measuring a temperature of the solar panel;
determining the instant maximum power condition of the solar panel;
selecting a condition of voltage and a condition of current that correspond to the instant maximum power point condition;
controlling the solar panel to provide the selected condition of voltage and condition of current;
comparing the instant maximum power condition to a model based upon the temperature and previously determined values for series and shunt resistances of the solar panel, wherein the previously determined values for series and shunt resistances are the values determined in a previous measuring cycle; and
if the instant maximum power condition varies from the model by more than a predetermined value, taking the additional steps of:
determining the instant series resistance of the solar panel;
determining the instant shunt resistance of the solar panel;
determining the cause of the variance from the model according to a rule,
wherein the previously determined series resistance is determined by the steps comprising:
increasing the output current value (Is) of the solar panel;
measuring the voltage output value (Vs) of the solar panel;
calculating an impedance using the formula $$\text{impedance} = (Vs - Vmp)/(Is - Imp),$$

wherein Vmp is the voltage value for the maximum power condition and Imp is the current value for the maximum power condition.

14. A method for determining the operating condition of a solar panel, wherein the solar panel is controlled by an electronic module, comprising the steps of:
measuring a temperature of the solar panel;
determining the instant maximum power condition of the solar panel;
selecting a condition of voltage and a condition of current that correspond to the instant maximum power point condition;
controlling the solar panel to provide the selected condition of voltage and condition of current;
comparing the instant maximum power condition to a model based upon the temperature and previously determined values for series and shunt resistances of the solar panel, wherein the previously determined values for series and shunt resistances are the values determined in a previous measuring cycle; and
if the instant maximum power condition varies from the model by more than a predetermined value, taking the additional steps of:
determining the instant series resistance of the solar panel;
determining the instant shunt resistance of the solar panel;
determining the cause of the variance from the model according to a rule,
wherein the previously determined shunt resistance is determined by the steps comprising:
decreasing the output current value (Ish) of the solar panel;
measuring the voltage output value (Vsh) of the solar panel;
calculating an impedance using the formula $$\text{impedance} = (Vsh - Vmp)/(Ish - Imp),$$

wherein Vmp is the voltage value for the maximum power condition and Imp is the current value for the maximum power condition.

15. An electronic module configured to determine the operating condition of a solar panel, comprising:
a processor;
a temperature sensing circuit coupled to the processor and configured for measuring the temperature of the solar panel;
a voltage sensing circuit coupled to the processor; and
a current sensing circuit coupled to the processor,
wherein the processor is configured with processor-executable instructions to perform operations comprising:
receiving a measured temperature of the solar panel;
determining an instant maximum power condition of the solar panel;
comparing the instant maximum power condition to a model based upon the temperature and previously determined values for series and shunt resistances of the solar panel; and
if the instant maximum power condition varies from the model by more than a predetermined value, taking the additional steps of:

determining the instant series resistance of the solar panel;

determining the instant shunt resistance of the solar panel; and determining a cause of the variance from the model according to a rule, wherein the rule determines that the solar panel is shaded if the solar panel is not damaged and further that power production of the solar panel is dissimilar to other nearby solar panels in a solar panel system.

16. The electronic module of claim 15, wherein the processor is configured to perform operations such that determining an instant maximum power condition of the solar panel comprises:

varying voltage and current relative to instant values for voltage and current;

recalculating power output; and selecting a condition of voltage and current that provides the highest power value.

17. The electronic module of claim 15, further comprising a non-volatile memory coupled to the processor, wherein the processor is configured to perform operations such that comparing the instant maximum power condition to a model based upon the temperature and previously determined values for series and shunt resistances of the solar panel comprises comparing the instant maximum power condition to a model based upon the temperature values for series and shunt resistances stored in the non-volatile memory that were previously determined by a manufacturer of the solar panel by testing after assembly of the solar panel.

18. The electronic module of claim 17, wherein the non-volatile memory has stored there on values of photovoltaic module open circuit voltage (Voc), photovoltaic module short circuit current (Isc), photovoltaic module voltage at maximum power (Vmp), photovoltaic module series resistance (Rs), and photovoltaic module shunt resistance (Rsh) parameters recorded during flash test of the solar panel.

19. The electronic module of claim 15, further comprising a non-volatile memory coupled to the processor, wherein the processor is configured to perform operations such that comparing the instant maximum power condition to a model based upon the temperature and previously determined values for series and shunt resistances of the solar panel comprises comparing the instant maximum power condition to a model based upon temperature values for series and shunt resistances stored in the non-volatile memory that were determined in a previous measuring cycle.

20. The electronic module of claim 15, wherein the processor is configured to perform operations such that determining a cause of the variance from the model according to a rule determines that a solar panel cell is damaged if the shunt resistance value is smaller than the previous shunt resistance value.

21. The electronic module of claim 15, wherein the processor is configured to perform operations such that determining a cause of the variance from the model according to a rule determines that a solar panel cell is damaged if the series resistance value is larger than the previous series resistance.

22. The electronic module of claim 15, wherein the processor is configured to perform operations such that determining a cause of the variance from the model according to a rule determines that a solar panel cell is damaged if the series resistance value and the shunt resistance value are both the same as their previous values.

23. The electronic module of claim 15, wherein the processor is configured to perform operations such that determining a cause of the variance from the model according to a rule determines that the solar panel is dirty if the power production of the solar panel is lower than the other nearby solar panels and the solation pattern of the solar panel is similar to the solation pattern of the other nearby solar panels.

24. The electronic module of claim 15, wherein the processor is configured to perform operations further comprising communicating temperature, maximum power voltage, maximum power current, series resistance, and shunt resistance to an outside data storage facility.

25. The electronic module of claim 15, further comprising an Internet connection coupled to the processor, wherein the processor is configured to perform operations further comprising communicating temperature, maximum power voltage, maximum power current, series resistance, and shunt resistance to an outside data storage facility via the Internet.

26. The electronic module of claim 15, further comprising a radio transmitter coupled to the processor, wherein the processor is configured to perform operations further comprising communicating temperature, maximum power voltage, maximum power current, series resistance, and shunt resistance to an outside data storage facility via the radio transmitter.

27. The electronic module of claim 15, wherein the processor is configured to perform operations such that the variation of the instant maximum power condition is more than 0.5 percent.

28. An electronic module configured to determine the operating condition of a solar panel, comprising:

a processor;

a non-volatile memory coupled to the processor;

a temperature sensing circuit coupled to the processor and configured for measuring the temperature of the solar panel;

a voltage sensing circuit coupled to the processor; and a current sensing circuit coupled to the processor, wherein the processor is configured with processor-executable instructions to perform operations comprising:

receiving a measured temperature of the solar panel;

determining an instant maximum power condition of the solar panel;

comparing the instant maximum power condition to a model based upon the temperature and previously determined values for series and shunt resistances of the solar panel stored in the non-volatile memory that were determined in a previous measuring cycle; and if the instant maximum power condition varies from the model by more than a predetermined value, taking the additional steps of:

determining the instant series resistance of the solar panel;

determining the instant shunt resistance of the solar panel;

determining a cause of the variance from the model according to a rule;

increasing the output current value (Is) of the solar panel;

measuring the voltage output value (Vs) of the solar panel;

calculating an impedance using the formula $$\text{impedance} = (Vs - Vmp)/(Is - Imp),$$

wherein Vmp is the voltage value for the maximum power condition and Imp is the current value for the maximum power condition; and storing the calculated impedance in the memory for use in the model as previously determined series resistance in subsequent measuring cycles.

29. An electronic module configured to determine the operating condition of a solar panel, comprising:
a processor;
a non-volatile memory coupled to the processor;
a temperature sensing circuit coupled to the processor and configured for measuring the temperature of the solar panel;
a voltage sensing circuit coupled to the processor; and
a current sensing circuit coupled to the processor,
wherein the processor is configured with processor-executable instructions to perform operations comprising:
receiving a measured temperature of the solar panel;
determining an instant maximum power condition of the solar panel;
comparing the instant maximum power condition to a model based upon the temperature and previously determined values for series and shunt resistances of the solar panel stored in the non-volatile memory that were determined in a previous measuring cycle; and
if the instant maximum power condition varies from the model by more than a predetermined value, taking the additional steps of:
determining the instant series resistance of the solar panel;
determining the instant shunt resistance of the solar panel;
determining a cause of the variance from the model according to a rule;
decreasing the output current value (Ish) of the solar panel;
measuring the voltage output value (Vsh) of the solar panel;
calculating an impedance using the formula impedance=$(Vsh-Vmp)/(Ish-Imp)$, wherein Vmp is the voltage value for the maximum power condition and Imp is the current value for the maximum power condition; and
storing the calculated impedance in the memory for use in the model as previously determined shunt resistance in subsequent measuring cycles.

30. A solar panel system, comprising:
a solar panel; and
an electronic module configured to determine the operating condition of the solar panel, comprising:
a processor;
a temperature sensing circuit coupled to the processor and configured for measuring the temperature of the solar panel;
a voltage sensing circuit coupled to the processor; and
a current sensing circuit coupled to the processor,
wherein the processor is configured with processor-executable instructions to perform operations comprising:
receiving a measured temperature of the solar panel;
determining an instant maximum power condition of the solar panel;
comparing the instant maximum power condition to a model based upon the temperature and previously determined values for series and shunt resistances of the solar panel; and
if the instant maximum power condition varies from the model by more than a predetermined value, perform further operations comprising:
determining the instant series resistance of the solar panel;
determining the instant shunt resistance of the solar panel; and
determining a cause of the variance from the model according to a rule,
wherein the rule determines that a solar panel is shaded if the solar panel is not damaged and further that power production of the solar panel is dissimilar to other nearby solar panels in a solar panel system.

31. The solar panel system of claim 30, wherein the processor is configured to perform operations such that determining an instant maximum power condition of the solar panel comprises:
varying voltage and current relative to instant values for voltage and current;
recalculating power output; and
selecting a condition of voltage and current that provides the highest power value.

32. The solar panel system of claim 30, further comprising a non-volatile memory coupled to the processor, wherein the processor is configured to perform operations such that comparing the instant maximum power condition to a model based upon the temperature and previously determined values for series and shunt resistances of the solar panel comprises comparing the instant maximum power condition to a model based upon the temperature values for series and shunt resistances stored in the non-volatile memory that were previously determined by a manufacturer of the solar panel by testing after assembly of the solar panel.

33. The solar panel system of claim 32, wherein the non-volatile memory has stored there on values of photovoltaic module open circuit voltage (Voc), photovoltaic module short circuit current (Isc), photovoltaic module voltage at maximum power (Vmp), photovoltaic module series resistance (Rs), and photovoltaic module shunt resistance (Rsh) parameters recorded during flash test of the solar panel.

34. The solar panel system of claim 30, further comprising a non-volatile memory coupled to the processor, wherein the processor is configured to perform operations such that comparing the instant maximum power condition to a model based upon the temperature and previously determined values for series and shunt resistances of the solar panel comprises comparing the instant maximum power condition to a model based upon temperature values for series and shunt resistances stored in the non-volatile memory that were determined in a previous measuring cycle.

35. The solar panel system of claim 30, wherein the processor is configured to perform operations such that determining a cause of the variance from the model according to a rule determines that a solar panel cell is damaged if the shunt resistance value is smaller than the previous shunt resistance value.

36. The solar panel system of claim 30, wherein the processor is configured to perform operations such that determining a cause of the variance from the model according to a rule determines that a solar panel cell is damaged if the series resistance value is larger than the previous series resistance.

37. The solar panel system of claim 30, wherein the processor is configured to perform operations such that determining a cause of the variance from the model according to a rule determines that a solar panel cell is damaged if the series resistance value and the shunt resistance value are both the same as their previous values.

38. The solar panel system of claim 30, wherein the processor is configured to perform operations such that determining a cause of the variance from the model according to a rule determines that the solar panel is dirty if the power production of the solar panel is lower than the other nearby solar panels and the solation pattern of the solar panel is similar to the solation pattern of the other nearby solar panels.

39. The solar panel system of claim 30, wherein the processor is configured to perform operations further comprising communicating temperature, maximum power voltage, maximum power current, series resistance, and shunt resistance to an outside data storage facility.

40. The solar panel system of claim 30, further comprising an Internet connection coupled to the processor, wherein the processor is configured to perform operations further comprising communicating temperature, maximum power voltage, maximum power current, series resistance, and shunt resistance to an outside data storage facility via the Internet.

41. The solar panel system of claim 30, further comprising a radio transmitter coupled to the processor, wherein the processor is configured to perform operations further comprising communicating temperature, maximum power voltage, maximum power current, series resistance, and shunt resistance to an outside data storage facility via the radio transmitter.

42. The solar panel system of claim 30, wherein the processor is configured to perform operations such that the variation of the instant maximum power condition is more than 0.5 percent.

43. A solar panel system, comprising:
a solar panel; and
an electronic module configured to determine the operating condition of the solar panel, comprising:
  a processor;
  a non-volatile memory coupled to the processor
  a temperature sensing circuit coupled to the processor and configured for measuring the temperature of the solar panel;
  a voltage sensing circuit coupled to the processor; and
  a current sensing circuit coupled to the processor,
  wherein the processor is configured with processor-executable instructions to perform operations comprising:
    receiving a measured temperature of the solar panel;
    determining an instant maximum power condition of the solar panel;
    comparing the instant maximum power condition to a model based upon the temperature and previously determined values for series and shunt resistances of the solar panel stored in the non-volatile memory that were determined in a previous measuring cycle; and
    if the instant maximum power condition varies from the model by more than a predetermined value, perform further operations comprising:
      determining the instant series resistance of the solar panel;
      determining the instant shunt resistance of the solar panel; and
      determining a cause of the variance from the model according to a rule;
      increasing the output current value (Is) of the solar panel;
      measuring the voltage output value (Vs) of the solar panel;
      calculating an impedance using the formula $$\text{impedance} = (Vs - Vmp)/(Is - Imp),$$

wherein Vmp is the voltage value for the maximum power condition and Imp is the current value for the maximum power condition; and
      storing the calculated impedance in the non-volatile memory for use in the model as previously determined series resistance in subsequent measuring cycles.

44. A solar panel system, comprising:
a solar panel; and
an electronic module configured to determine the operating condition of the solar panel, comprising:
  a processor;
  a non-volatile memory coupled to the processor
  a temperature sensing circuit coupled to the processor and configured for measuring the temperature of the solar panel;
  a voltage sensing circuit coupled to the processor; and
  a current sensing circuit coupled to the processor,
  wherein the processor is configured with processor-executable instructions to perform operations comprising:
    receiving a measured temperature of the solar panel;
    determining an instant maximum power condition of the solar panel;
    comparing the instant maximum power condition to a model based upon the temperature and previously determined values for series and shunt resistances of the solar panel stored in the non-volatile memory that were determined in a previous measuring cycle; and
    if the instant maximum power condition varies from the model by more than a predetermined value, perform further operations comprising:
      determining the instant series resistance of the solar panel;
      determining the instant shunt resistance of the solar panel; and
      determining a cause of the variance from the model according to a rule;
      decreasing the output current value (Ish) of the solar panel;
      measuring the voltage output value (Vsh) of the solar panel;
      calculating an impedance using the formula $$\text{impedance} = (Vsh - Vmp)/(Ish - Imp),$$

wherein Vmp is the voltage value for the maximum power condition and Imp is the current value for the maximum power condition; and
      storing the calculated impedance in the non-volatile memory for use in the model as previously determined shunt resistance in subsequent measuring cycles.

* * * * *